(12) United States Patent
Wang et al.

(10) Patent No.: US 12,200,661 B2
(45) Date of Patent: Jan. 14, 2025

(54) PAGING METHOD AND COMMUNICATION APPARATUS

(71) Applicant: Huawei Technologies Co., Ltd., Shenzhen (CN)

(72) Inventors: Hong Wang, Beijing (CN); Bin Xu, Beijing (CN); Bingzhao Li, Beijing (CN); Lei Chen, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 348 days.

(21) Appl. No.: 17/867,372

(22) Filed: Jul. 18, 2022

(65) Prior Publication Data
US 2022/0353844 A1 Nov. 3, 2022

Related U.S. Application Data

(63) Continuation of application No. PCT/CN2020/073069, filed on Jan. 19, 2020.

(51) Int. Cl.
*H04W 76/28* (2018.01)
*H04W 52/02* (2009.01)
*H04W 68/00* (2009.01)

(52) U.S. Cl.
CPC .......... *H04W 68/00* (2013.01); *H04W 76/28* (2018.02)

(58) Field of Classification Search
None
See application file for complete search history.

(56) References Cited

U.S. PATENT DOCUMENTS

| 10,057,879 B2 | 8/2018 | Hu et al. | |
| 2015/0282080 A1* | 10/2015 | Maattanen | H04W 76/28 |
| | | | 370/311 |

(Continued)

FOREIGN PATENT DOCUMENTS

| CN | 105191356 A | 12/2015 |
| CN | 109699051 A | 4/2019 |
| CN | 110099394 A | 8/2019 |

OTHER PUBLICATIONS

"Mobile-Termination with non-continuous coverage in NTN," Agenda Item: 9.2.2, Source: GateHouse, Sateliot, ESA, Document for: Discussion, 3GPP TSG RAN WG2 Meeting #114, R2-2105860, Electronic Meeting, May 19-27, 2021, 3 pages.

(Continued)

*Primary Examiner* — Sai Aung
(74) *Attorney, Agent, or Firm* — Slater Matsil, LLP

(57) ABSTRACT

Embodiments of this application provide a paging method and a communication apparatus, relate to the communications field, and are particularly applicable to NTN communication. The method includes: receiving a first message from a first network device, where the first message includes discontinuous reception DRX cycle information, the DRX cycle information is determined based on signal coverage cycle information of a second network device, the DRX cycle information is used to configure a DRX cycle $T_{UE}$ used by the terminal device to receive the paging message, and the signal coverage cycle information indicates a signal coverage cycle of the second network device; and receiving a paging message from the second network device based on the DRX cycle information.

20 Claims, 7 Drawing Sheets

(56) References Cited

U.S. PATENT DOCUMENTS

| | | | |
|---|---|---|---|
| 2015/0319802 A1* | 11/2015 | Lindoff | H04W 24/02 |
| | | | 455/422.1 |
| 2016/0044578 A1* | 2/2016 | Vajapeyam | H04W 48/12 |
| | | | 370/252 |
| 2016/0234804 A1 | 8/2016 | Hu et al. | |
| 2019/0394770 A1 | 12/2019 | Wang et al. | |
| 2020/0178172 A1* | 6/2020 | Thangarasa | H04W 76/28 |
| 2021/0037469 A1* | 2/2021 | Åström | H04W 68/005 |
| 2021/0227618 A1* | 7/2021 | Tang | H04W 52/28 |
| 2021/0321334 A1* | 10/2021 | Thangarasa | H04W 52/0235 |
| 2022/0190886 A1* | 6/2022 | Islam | H04W 72/1268 |

OTHER PUBLICATIONS

"3rd Generation Partnership Project; Technical Specification Group Radio Access Network; Study on New Radio (NR) to support non-terrestrial networks (Release 15)," 3GPP TR 38.811 V15.2.0, Sep. 2019, 126 pages.

"3rd Generation Partnership Project; Technical Specification Group Core Network and Terminals; Mobile radio interface Layer 3 specification; Core network protocols; Stage 3 (Release 16)," 3GPP TS 24.008 V16.3.0, 794 pages.

3GPP TS 24.501 V16.3.0, Dec. 2019, 645 pages.

"3rd Generation Partnership Project; Technical Specification Group Radio Access Network; NR; Radio Resource Control (RRC) protocol specification (Release 15)," 3GPP TS 38.331 V15.8.0, Dec. 2019, 532 pages.

* cited by examiner

PAGING METHOD AND COMMUNICATION APPARATUS

CROSS-REFERENCE TO RELATED APPLICATIONS

This application is a continuation of International Application No. PCT/CN2020/073069, filed on Jan. 19, 2020, the disclosure of which is hereby incorporated by reference in its entirety.

TECHNICAL FIELD

Embodiments of this application relate to the communication field, and in particular, to a paging method and a communication apparatus.

BACKGROUND

In recent years, with development of communication technologies, a non-terrestrial network communication service emerges. To be specific, a base station is carried on a high-altitude aircraft, to provide network coverage for a terminal device on the ground. For example, signal transmission is performed by using a satellite, an airplane, a balloon, or the like.

In a conventional technology, when there is no uplink/downlink service data transmission between a terminal device and a base station, the terminal device is in an idle mode or an inactive mode of a radio resource control (RRC) connection. In this mode, the base station may wake up the terminal device by using a paging process. After receiving a paging message sent by the base station, the terminal device initiates a random access process, and establishes the RRC connection to the base station.

In an actual scenario, the base station pages the terminal device at any time. Therefore, the terminal device needs to monitor a physical downlink control channel (PDCCH), to receive the paging message based on downlink control information (DCI) carried on the PDCCH. To reduce power consumption of monitoring the PDCCH by the terminal device, a discontinuous reception (DRX) mechanism may be applied to the terminal device, so that the terminal device wakes up based on a DRX cycle to monitor the PDCCH. Due to movement of a satellite base station, the terminal device may experience different satellite base stations when waking up in a next DRX cycle. Consequently, the terminal device needs to frequently read system information of the different satellite base stations, and this increases power consumption of the terminal device.

SUMMARY

Embodiments of this application provide a paging method and a communication apparatus, so that a terminal device is served by a same base station when the terminal device is woken up, and power consumption of reading a system message by the terminal device is reduced.

According to a first aspect, a paging method is provided. The method is applicable to a terminal device, and the method includes receiving a first message from a first network device, where the first message includes DRX cycle information, the DRX cycle information is determined based on signal coverage cycle information of a second network device, the DRX cycle information is used to configure a DRX cycle $T_{UE}$ used by the terminal device to receive a paging message, and the signal coverage cycle information indicates a signal coverage cycle of the second network device, and a paging message may be further received from the second network device based on the DRX cycle information.

In this embodiment of this application, a DRX cycle of the terminal device may be configured based on a signal coverage cycle of a base station (for example, the second network device in this embodiment of this application), so that the terminal device wakes up in signal coverage of a same base station as much as possible in each DRX cycle. The terminal device does not need to obtain system information of another base station, and may establish a connection to the same base station based on a previously obtained system message. This prevents the terminal device from frequently obtaining system information of different base stations and reduces power consumption of the terminal device.

With reference to the first aspect, in a first possible implementation of the first aspect, the method further includes sending a second message to the first network device, where the second message includes at least one of first duration, first information, and second information, where the first duration is determined based on a signal coverage cycle, and indicates an expected DRX cycle $T_g$ of the terminal device, the first information indicates that the terminal device supports a DRX cycle $T_{UE}$ determined based on the signal coverage cycle, and the second information indicates a first offset Offset 1 of the DRX cycle $T_g$.

This embodiment of this application further provides another information element that may be included in the second message. When the first duration is included, the first network device may determine the DRX cycle $T_{UE}$ based on duration of the signal coverage cycle of the second network device. When the expected DRX cycle $T_g$ of the terminal device is included, the first network device may determine the DRX cycle $T_{UE}$ based on the signal coverage cycle of the second network device and the expected DRX cycle $T_E$ of the terminal device. When the first offset Offset 1 of the DRX cycle $T_g$ is included, the first network device may determine a second offset Offset 2 of the DRX cycle $T_{UE}$ based on the Offset 1.

With reference to the first aspect or the first possible implementation of the first aspect, in a second possible implementation of the first aspect, the DRX cycle $T_{UE}$ is an integer multiple of the signal coverage cycle.

In this embodiment of this application, a specific implementation of determining the DRX cycle $T_{UE}$ based on the signal coverage cycle of the second network device may be that the DRX cycle $T_{UE}$ is an integer multiple of the signal coverage cycle, so that it can be ensured that the terminal device wakes up in the signal coverage of the same base station in each DRX cycle. This prevents the terminal device from frequently obtaining system information of different base stations and reduces power consumption of the terminal device.

With reference to the first aspect or the first or the second possible implementation of the first aspect, in a third possible implementation of the first aspect, the first message further includes third information, where the third information indicates a second offset Offset 2 of the DRX cycle $T_{UE}$.

In this embodiment of this application, other information that may be included in the first message is provided, for example, an offset of the DRX cycle $T_{UE}$. The terminal device determines a boundary of the DRX cycle based on the offset.

With reference to the third possible implementation of the first aspect, in a fourth possible implementation of the first aspect, the method further includes determining, based on the DRX cycle $T_{UE}$ and the second offset Offset 2, time t' for receiving the paging message.

In this embodiment of this application, the terminal device may determine, based on the DRX cycle $T_{UE}$ configured by the first network device and the offset of the DRX cycle $T_{UE}$, the time for receiving the paging message, to establish a connection to the second network device based on the paging message.

With reference to the fourth possible implementation of the first aspect, in a fifth possible implementation of the first aspect, t'=(Offset 2+R*$T_{UE}$) mod $T_C$, where R is a positive integer and $T_C$ is a system time cycle, or t' is system time $t_S$ that satisfies the formula ($t_S$+Offset 2) mod $T_{UE}$E=UE-ID mod $T_{UE}$, where UE-ID is an identifier of the UE or is generated based on the identifier of the UE.

This embodiment of this application provides a specific implementation of determining, based on the DRX cycle $T_{UE}$ and the offset of the DRX cycle $T_{UE}$, the time for receiving the paging message, so that the terminal device can accurately receive the paging message sent by the second network device, to establish a connection to the second network device.

With reference to the fifth possible implementation of the first aspect, in a sixth possible implementation of the first aspect, the method further includes, when the terminal device receives the first message from the first network device, setting R to 0 or 1, or when R reaches a first threshold, setting R to 0 or 1, where the first threshold is predefined or preconfigured.

This embodiment of this application further provides a counting method for updating R, and the terminal device may calculate, based on a value of R, time for receiving the paging message.

With reference to any one of the first aspect, or the first to the sixth possible implementations of the first aspect, in a seventh possible implementation of the first aspect, the method further includes receiving fourth information from the second network device, where the fourth information indicates the signal coverage cycle.

In this embodiment of this application, the terminal device may further receive the fourth information sent by the second network device, and determine the signal coverage cycle of the second network device based on the fourth information, to request a DRX cycle based on the signal coverage cycle, so that the terminal device is in signal coverage of a same base station when waking up in each DRX cycle.

With reference to any one of the first aspect, or the first to the seventh possible implementations of the first aspect, in an eighth possible implementation of the first aspect, the first network device and the second network device are a same network device.

In this embodiment of this application, the base station may configure an actually used DRX cycle $T_{UE}$ for the terminal device. For example, the first network device and the second network device are the same network device. For example, the first network device and the second network device are a same base station.

According to a second aspect, a paging method is provided. The method is applicable to a first network device, and the method includes determining DRX cycle information of a terminal device based on signal coverage cycle information of a second network device, where the DRX cycle information is used to configure a DRX cycle $T_{UE}$ used by the terminal device to receive a paging message, and the signal coverage cycle information indicates a signal coverage cycle of the second network device, and a first message may be further sent to the terminal device, where the first message includes the DRX cycle information.

In this embodiment of this application, a DRX cycle of the terminal device may be configured based on a signal coverage cycle of a base station (for example, the second network device in this embodiment of this application), so that the terminal device wakes up in signal coverage of a same base station as much as possible in each DRX cycle. The terminal device does not need to obtain system information of another base station, and may establish a connection to the same base station based on a previously obtained system message. This prevents the terminal device from frequently obtaining system information of different base stations and reduces power consumption of the terminal device.

With reference to the second aspect, in a first possible implementation of the second aspect, the method further includes receiving a second message from the terminal device, where the second message includes at least one of first duration, first information, and second information, where the first duration is determined based on a signal coverage cycle, and indicates an expected DRX cycle $T_E$ of the terminal device, the first information indicates that the terminal device supports configuration of a DRX cycle determined based on the signal coverage cycle, and the second information indicates a first offset Offset 1 of the DRX cycle $T_E$.

With reference to the second aspect or the first possible implementation of the second aspect, in a second possible implementation of the second aspect, the DRX cycle $T_{UE}$ is an integer multiple of the signal coverage cycle.

With reference to the second aspect or the first or the second possible implementation of the second aspect, in a third possible implementation of the second aspect, the first message further includes third information, where the third information indicates the second offset Offset 2 of the DRX cycle $T_{UE}$.

With reference to the third possible implementation of the second aspect, in a fourth possible implementation of the second aspect, the method further includes sending the second offset Offset 2 to the second network device, where the Offset 2 is a second offset of the DRX cycle $T_{UE}$.

With reference to the fourth possible implementation of the second aspect, in a fifth possible implementation of the second aspect, the $T_{UE}$ and the Offset 2 are used for the second network device to determine time t' for sending the paging message, and t'=(Offset 2+R*$T_{UE}$) mod $T_C$, where R is a positive integer and $T_C$ is a system time cycle, or t' is system time $t_S$ that satisfies the formula ($t_S$+Offset 2) mod $T_{UE}$=UE-ID mod $T_{UE}$, where UE-ID is an identifier of the user equipment UE or is generated based on the identifier of the UE.

With reference to the fifth possible implementation of the second aspect, in a sixth possible implementation of the second aspect, when the first network device sends the first message to the terminal device, the first network device sets R to 0 or 1, or when R reaches a second threshold, the first network device sets R to 0 or 1, where the second threshold is predefined or preconfigured.

With reference to any one of the second aspect, or the first to the sixth possible implementations of the second aspect, in a seventh possible implementation of the second aspect, the method further includes sending the DRX cycle information to the second network device.

With reference to any one of the second aspect, or the first to the seventh possible implementations of the second aspect, in an eighth possible implementation of the second aspect, the first network device and the second network device are a same network device.

According to a third aspect, a paging method is provided. The method is applicable to a second network device, and the method includes receiving DRX cycle information from a first network device, where the DRX cycle information is used to configure a DRX cycle $T_{UE}$ used by a terminal device to receive a paging message, and the DRX cycle $T_{UE}$ is determined based on a signal coverage cycle of the second network device, and the paging message may be further sent to the terminal device based on the DRX cycle $T_{UE}$.

In this embodiment of this application, a DRX cycle of the terminal device may be configured based on a signal coverage cycle of a base station (for example, the second network device in this embodiment of this application), so that the terminal device wakes up in signal coverage of a same base station as much as possible in each DRX cycle. The terminal device does not need to obtain system information of another base station, and may establish a connection to the same base station based on a previously obtained system message. This prevents the terminal device from frequently obtaining system information of different base stations and reduces power consumption of the terminal device.

With reference to the third aspect, in a first possible implementation of the third aspect, the DRX cycle $T_{UE}$ is an integer multiple of the signal coverage cycle.

With reference to the third aspect or the first possible implementation of the third aspect, in a second possible implementation of the third aspect, the method further includes receiving a second offset Offset 2 from the first network device, where the Offset 2 is a second offset of the DRX cycle $T_{UE}$.

With reference to the second possible implementation of the third aspect, in a third possible implementation of the third aspect, the $T_{UE}$ and the Offset 2 are used for the second network device to determine time t' for sending the paging message, and t'=(Offset 2+R*$T_{UE}$) mod $T_C$, where R is a positive integer and $T_C$ is a system time cycle, or t' is system time $t_S$ that satisfies the formula ($t_S$+Offset 2) mod $T_{UE}$=UE-ID mod $T_{UE}$, where UE-ID is an identifier of the user equipment UE or is generated based on the identifier of the UE.

With reference to any one of the third aspect, or the first to the third possible implementations of the third aspect, in a fourth possible implementation of the third aspect, the method further includes receiving the DRX cycle $T_{UE}$ from the first network device.

With reference to any one of the third aspect, or the first to the third possible implementations of the third aspect, in a fourth possible implementation of the third aspect, the first network device and the second network device are a same network device.

According to a fourth aspect, a communication apparatus is provided, including a communication unit, configured to receive a first message from a first network device, and the first message includes discontinuous reception DRX cycle information, where DRX cycle information is determined based on signal coverage cycle information of a second network device, the DRX cycle information is used to configure a DRX cycle $T_{UE}$ used by a terminal device to receive a paging message, and the signal coverage cycle information indicates a signal coverage cycle of the second network device, and a processing unit, configured to receive a paging message from the second network device based on the DRX cycle information.

With reference to the fourth aspect, in a first possible implementation of the fourth aspect, the communication unit is further configured to send a second message to the first network device, where the second message includes at least one of first duration, first information, and second information, where the first duration is determined based on a signal coverage cycle, and indicates an expected DRX cycle $T_g$ of the terminal device, the first information indicates that the terminal device supports a DRX cycle $T_{UE}$ determined based on the signal coverage cycle, and the second information indicates a first offset Offset 1 of the DRX cycle $T_g$.

With reference to the fourth aspect or the first possible implementation of the fourth aspect, in a second possible implementation of the fourth aspect, the DRX cycle $T_{UE}$ is an integer multiple of the signal coverage cycle.

With reference to the fourth aspect or the first or the second possible implementation of the fourth aspect, in a third possible implementation of the fourth aspect, the first message further includes third information, where the third information indicates a second offset Offset 2 of the DRX cycle $T_{UE}$.

With reference to the third possible implementation of the fourth aspect, in a fourth possible implementation of the fourth aspect, the processing unit is further configured to determine, based on the DRX cycle $T_{UE}$ and the second offset Offset 2, time t' for receiving the paging message.

With reference to the fourth possible implementation of the fourth aspect, in a fifth possible implementation of the fourth aspect, t'=(Offset 2+R*$T_{UE}$) mod $T_C$, where R is a positive integer and $T_C$ is a system time cycle, or t' is system time $t_S$ that satisfies the formula ($t_S$+Offset 2) mod $T_{UE}$=UE-ID mod $T_{UE}$, where UE-ID is an identifier of the UE or is generated based on the identifier of the UE.

With reference to the fifth possible implementation of the fourth aspect, in a sixth possible implementation of the fourth aspect, the processing unit is further configured to, when the communication unit receives the first message from the first network device, set R to 0 or 1, or when R reaches a first threshold, set R to 0 or 1, where the first threshold is predefined or preconfigured.

With reference to any one of the fourth aspect, or the first to the sixth possible implementations of the fourth aspect, in a seventh possible implementation of the fourth aspect, the communication unit is further configured to receive fourth information from the second network device, where the fourth information indicates the signal coverage cycle.

With reference to any one of the fourth aspect, or the first to the seventh possible implementations of the fourth aspect, in an eighth possible implementation of the fourth aspect, the first network device and the second network device are a same network device.

According to a fifth aspect, a communication apparatus is provided, including a processing unit, configured to determine DRX cycle information of a terminal device based on signal coverage cycle information of a second network device, where the DRX cycle information is used to configure a DRX cycle $T_UE$ used by the terminal device to receive a paging message, and the signal coverage cycle information indicates a signal coverage cycle of the second network device, and a communication unit, configured to send a first message to the terminal device, where the first message includes the DRX cycle information.

With reference to the fifth aspect, in a first possible implementation of the fifth aspect, the communication unit is further configured to receive a second message from the terminal device, where the second message includes at least one of first duration, first information, and second information, where the first duration is determined based on a signal coverage cycle, and indicates an expected DRX cycle $T_g$ of the terminal device, the first information indicates that the terminal device supports configuration of a DRX cycle determined based on the signal coverage cycle, and the second information indicates a first offset Offset 1 of the DRX cycle $T_E$.

With reference to the fifth aspect or the first possible implementation of the fifth aspect, in a second possible implementation of the fifth aspect, the DRX cycle $T_{UE}$ is an integer multiple of the signal coverage cycle.

With reference to the fifth aspect or the first or the second possible implementation of the fifth aspect, in a third possible implementation of the fifth aspect, the first message further includes third information, where the third information indicates a second offset Offset 2 of the DRX cycle $T_{UE}$.

With reference to the third possible implementation of the fifth aspect, in a fourth possible implementation of the fifth aspect, the communication unit is further configured to send the second offset Offset 2 to the second network device.

With reference to the fourth possible implementation of the fifth aspect, in a fifth possible implementation of the fifth aspect, the $T_{UE}$ and the Offset 2 are used for the second network device to determine time t' for sending the paging message, and t'=(Offset 2+R*$T_{UE}$) mod $T_C$, where R is a positive integer and $T_C$ is a system time cycle, or t' is system time $t_S$ that satisfies the formula ($t_S$+Offset 2) mod $T_{UE}$=UE-ID mod $T_{UE}$, where UE-ID is an identifier of the user equipment UE or is generated based on the identifier of the UE.

With reference to the fifth possible implementation of the fifth aspect, in a sixth possible implementation of the fifth aspect, when the communication unit sends the first message to the terminal device, a first network device sets R to 0 or 1, or when R reaches a second threshold, a first network device sets R to 0 or 1, where the second threshold is predefined or preconfigured.

With reference to the fifth aspect, or the first to the sixth possible implementations of the fifth aspect, in a seventh possible implementation of the fifth aspect, the communication unit is further configured to send the DRX cycle information to the second network device.

With reference to the fifth aspect, or the first to the seventh possible implementations of the fifth aspect, in an eighth possible implementation of the fifth aspect, the communication apparatus and the second network device are a same network device.

According to a sixth aspect, a communication apparatus is provided, including a communication unit, configured to receive DRX cycle information from a first network device, where the DRX cycle information is used to configure a DRX cycle $T_{UE}$ used by a terminal device to receive a paging message, and the DRX cycle $T_{UE}$ is determined based on a signal coverage cycle of a second network device, and a processing unit, configured to send the paging message to the terminal device based on the DRX cycle $T_{UE}$.

With reference to the sixth aspect, in a first possible implementation of the sixth aspect, the DRX cycle $T_{UE}$ is an integer multiple of the signal coverage cycle.

With reference to the sixth aspect or the first possible implementation of the sixth aspect, in a second possible implementation of the sixth aspect, a communication unit is further configured to receive a second offset Offset 2 from the first network device, where the Offset 2 is a second offset of the DRX cycle $T_{UE}$.

With reference to the second possible implementation of the sixth aspect, in a third possible implementation of the sixth aspect, the $T_{UE}$ and the Offset 2 are used for the second network device to determine time t' for sending the paging message, and t'=(Offset 2+R*$T_{UE}$) mod $T_C$, where R is a positive integer and $T_C$ is a system time cycle, or t' is system time $t_S$ that satisfies the formula ($t_S$+Offset 2) mod $T_{UE}$=UE-ID mod $T_{UE}$, where UE-ID is an identifier of the user equipment UE or is generated based on the identifier of the UE.

With reference to the sixth aspect, or the first to the third possible implementations of the sixth aspect, in a fourth possible implementation of the sixth aspect, the communication unit is further configured to receive the DRX cycle $T_{UE}$ from the first network device.

With reference to any one of the sixth aspect, or the first to the fourth possible implementations of the sixth aspect, in a fifth possible implementation of the sixth aspect, the first network device and the communication apparatus are a same network device.

It should be noted that when the communication apparatus is a network device, a terminal device, or a combined component that can implement functions of the network device and the terminal device, the communication unit may be a transceiver, and may include an antenna, a radio frequency circuit, and the like. The transceiver may be an integrated transmitter and receiver. The processing module may be a processor, for example, a baseband chip. When the communication apparatus is a component having functions of the foregoing network device and terminal device, the communication unit may be a radio frequency unit, and the processing module may be a processor. When the communication apparatus is a chip system, the communication unit may be an input/output interface of the chip system, and the processing module may be a processor of the chip system, for example, a central processing unit (CPU).

According to a seventh aspect, a communication apparatus is provided, including at least one processor and a communication interface, where the processor is configured to perform the method according to any one of the second aspect or the implementations of the second aspect, or the method according to any one of the first aspect or the implementations of the first aspect, or the method according to any one of the third aspect or the implementations of the third aspect.

The communication interface is used for communication between the communication apparatus and another device.

Optionally, the communication apparatus may further include a memory. The at least one processor may be coupled to the memory. The memory is configured to store a computer program.

The at least one processor is configured to execute the computer program stored in the memory, so that the apparatus is enabled to perform the method according to any one of the second aspect or the implementations of the second aspect, or the method according to any one of the first aspect or the implementations of the first aspect, or the method according to any one of the third aspect or the implementations of the third aspect.

According to an eighth aspect, a computer-readable storage medium is provided, The computer-readable storage medium stores instructions, and when the computer-readable storage medium runs on the communication apparatus according to any one of the fourth aspect or the implementations of the fourth aspect, the communication apparatus is enabled to perform the communication method according to any one of the first aspect or the implementations of the first aspect.

According to a ninth aspect, a computer-readable storage medium is provided, The computer-readable storage medium stores instructions, and when the computer-readable storage medium runs on the communication apparatus according to any one of the fifth aspect or the implementations of the fifth aspect, the communication apparatus is enabled to perform the communication method according to any one of the second aspect or the implementations of the second aspect.

According to a tenth aspect, a computer-readable storage medium is provided, The computer-readable storage medium stores instructions, and when the computer-readable storage medium runs on the communication apparatus according to any one of the sixth aspect or the implementations of the sixth aspect, the communication apparatus is enabled to perform the communication method according to any one of the third aspect or the implementations of the third aspect.

According to an eleventh aspect, a wireless communication apparatus is provided, where the communication apparatus includes a processor. For example, the processor is used in the communication apparatus, to implement the method according to any one of the first aspect or the implementations of the first aspect. The communication apparatus may be, for example, a chip system. In a feasible implementation, the chip system further includes a memory, and the memory is configured to store program instructions and data that are necessary for implementing a function in the method in the first aspect.

According to a twelfth aspect, a wireless communication apparatus is provided, where the communication apparatus includes a processor. For example, the processor is used in the communication apparatus, to implement the method according to any one of the second aspect or the implementations of the second aspect or a function in the method. The communication apparatus may be, for example, a chip system. In a feasible implementation, the chip system further includes a memory, and the memory is configured to store program instructions and data that are necessary for implementing a function in the method in the second aspect.

According to a thirteenth aspect, a wireless communication apparatus is provided, where the communication apparatus includes a processor. For example, the processor is used in the communication apparatus, to implement the method according to any one of the third aspect or the implementations of the third aspect or a function in the method. The communication apparatus may be, for example, a chip system. In a feasible implementation, the chip system further includes a memory, and the memory is configured to store program instructions and data that are necessary for implementing the function in the method in the third aspect.

The chip system in the foregoing aspects may be a system on chip (SOC), a baseband chip, or the like. The baseband chip may include a processor, a channel encoder, a digital signal processor, a modem, an interface module, and the like.

According to a fourteenth aspect, a communication system is provided, including a first network device, a second network device, and a terminal device.

The first network device determines DRX cycle information of the terminal device based on signal coverage cycle information of the second network device, where the DRX cycle information is used to configure a DRX cycle $T_{UE}$ used by the terminal device to receive a paging message, and the signal coverage cycle information indicates the signal coverage cycle of the second network device, and the first network device may further send a first message to the terminal device, where the first message includes the DRX cycle information.

The second network device receives the DRX cycle $T_{UE}$ from the first network device, and may further send the paging message to the terminal device based on the DRX cycle $T_{UE}$.

The terminal device receives the first message from the first network device, and may further receive the paging message from the second network device based on the DRX cycle information.

For a specific execution process of the terminal device, refer to any one of the first aspect and the possible implementations of the first aspect. Details are not described herein again. For a specific execution process of the first network device, refer to any one of the second aspect and the possible implementations of the second aspect. Details are not described herein again. For a specific execution process of the second network device, refer to any one of the third aspect and the possible implementations of the third aspect. Details are not described herein again.

DETAILED DESCRIPTION OF ILLUSTRATIVE EMBODIMENTS

Figure 1:
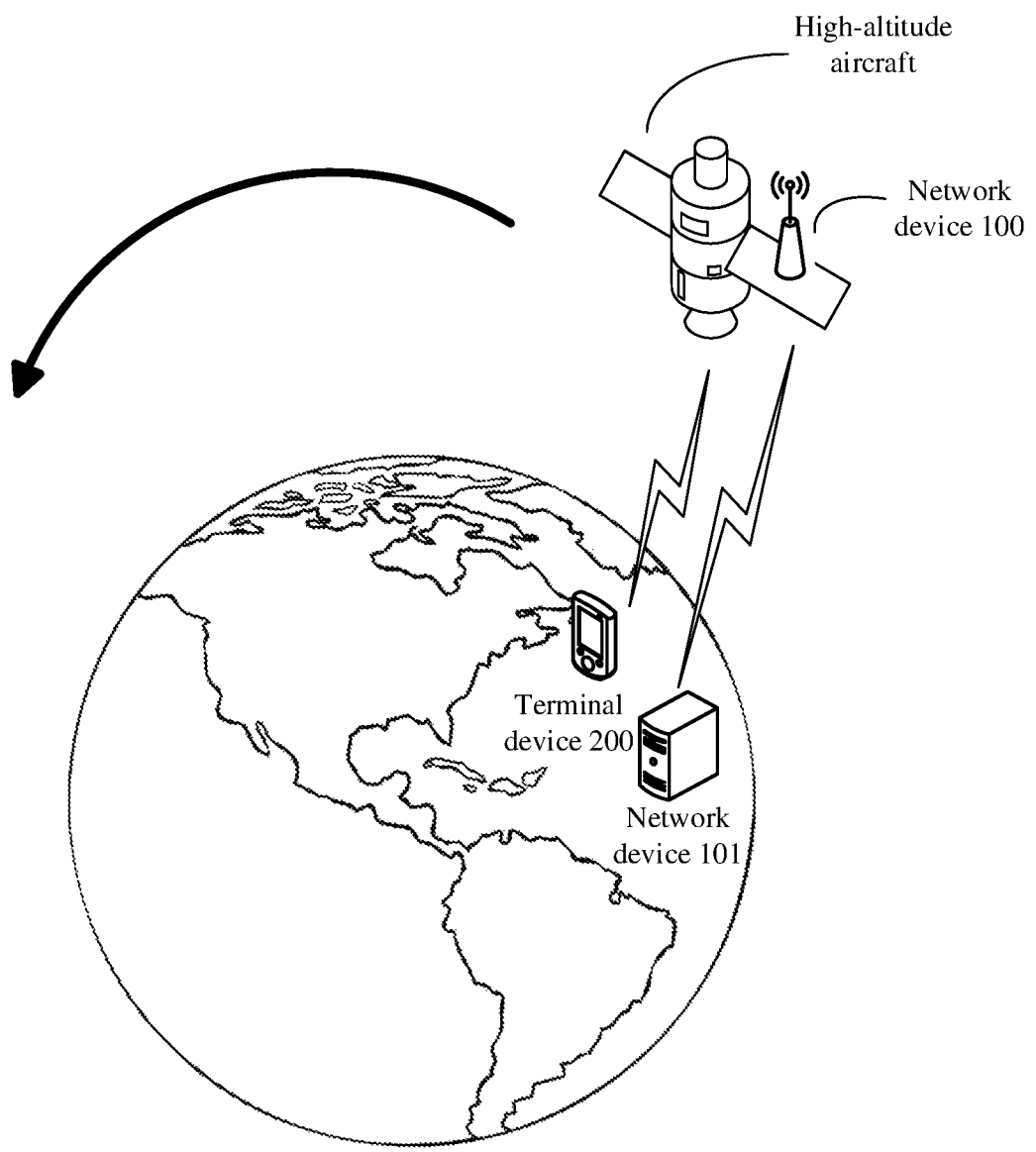
FIG. 1 is a schematic diagram of a communication system according to an embodiment of this application.

FIG. 1 is a schematic diagram of a communication system to which the technical solutions provided in this application are applicable. The communication system may include a plurality of network devices (where only a network device wo and a network device 101 are shown) and a plurality of terminal devices (where only a terminal device 200 is shown in the figure). FIG. 1 is merely a schematic diagram, and does not constitute a limitation on an application scenario of the technical solutions provided in this application.

In the system shown in FIG. 1, the network device wo is carried on a high-altitude aircraft (for example, a satellite), the high-altitude aircraft periodically runs around the earth, and the terminal device 200 is located on the ground.

Because the network device wo provides a large signal coverage area and runs in a short orbital period, for the terminal device 200, when signal coverage provided by the network device wo periodically appears in a same geographical area, the terminal device 200 generally does not move out of the geographical area. Refer to FIG. 1. When the network device wo runs to a place on a track of the network device 100, the terminal device 200 may obtain system information of the network device 100, and perform communication in the signal coverage area of the network device 100. When the network device wo continues running, the terminal device 200 leaves the signal coverage area of the network device 100, and the network device wo no longer provides signal coverage for the terminal device 200.

In a scenario in which networks are carried on satellites, the satellites can be classified into a low-earth orbit (LEO) satellite, a medium-earth orbit (MEO) satellite, a geosynchronous earth orbit (GEO) satellite, and a highly elliptical orbit (HEO) satellite based on different satellite orbit heights.

The network device 100 may be any device having a wireless transceiver function. The network device wo includes but is not limited to an evolved NodeB (E-UTRAN NodeB, e-NodeB, or eNB) in LTE, a base station (gNodeB or gNB) or a transmission/reception point (TRP) in a 5G or new radio (NR) access technology, a subsequently evolved base station in the 3GPP, and an access node, a wireless relay node, a wireless backhaul node, and the like in a Wi-Fi system. The base station may be a macro base station, a micro base station, a picocell base station, a small cell, a relay station, a balloon station, or the like. A plurality of base stations may support networks using a same technology mentioned above, or may support networks using different technologies mentioned above. The base station may include one or more co-site or non-co-site TRPs. Alternatively, the network device may alternatively be a radio controller, a centralized unit (CU), and/or a distributed unit (DU) in a cloud radio access network (CRAN) scenario. The network device may alternatively be a server, a wearable device, a vehicle-mounted device, or the like. An example in which the network device is a base station is used for description below. The plurality of network devices may be base stations of a same type, or may be base stations of different types. The base station may communicate with a terminal device, or may communicate with the terminal device by using a relay station. The terminal device may communicate with a plurality of base stations using different technologies. For example, the terminal device may communicate with a base station supporting an LTE network, or may communicate with a base station supporting a 5G network, or may support dual connectivity to a base station in an LTE network and a base station in a 5G network.

The network device 101 may be an access and mobility management function (AMF) network element. The AMF is mainly responsible for functions such as registration management of a terminal, connection management of the terminal, reachability management of the terminal, access authorization and access authentication of the terminal, a security function of the terminal, mobility management of the terminal, network slice selection, and SMF selection. The AMF serves as an anchor of an N1/N2 interface signaling connection, provides the SMF with routing of an N1/N2 interface session management (SM) message, and maintains and manages state information of the UE.

The terminal device (for example, the terminal device 200) is a device having a wireless transceiver function, and may be a device deployed on land, including an indoor or outdoor device, a handheld device, a wearable device, or a vehicle-mounted device, or may be deployed on water (for example, on a ship), or may be deployed in the air (for example, on an airplane, a balloon, or a satellite). The terminal device may be a mobile phone, a tablet computer (pad), a computer having a wireless transceiver function, a virtual reality (VR) terminal device, an augmented reality (AR) terminal device, a wireless terminal in industrial control (industrial control), a vehicle-mounted terminal device, a wireless terminal in self-driving, a wireless terminal in telemedicine (remote medical), a wireless terminal in a smart grid, a wireless terminal in transportation safety, a wireless terminal in a smart city, a wireless terminal in a smart home, a wearable terminal device, or the like. An application scenario is not limited in embodiments of this application. The terminal may also be sometimes referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a terminal device, a wireless communication device, a UE agent, a UE apparatus, or the like. The terminal may be fixed or mobile. The terminal device in this application may alternatively be an in-vehicle module, an in-vehicle module set, an onboard component, an automotive chip, or an on board unit that is built in a vehicle as one or more components or units. The vehicle may implement the method in this application by using the in-vehicle module, the in-vehicle module set, the onboard component, the automotive chip, or the on board unit that is built in the vehicle.

First, terms in embodiments of this application are explained and described.

Radio Resource Control (RRC) Mode

The terminal device has three RRC modes: an RRC connected mode, an RRC idle mode, and an inactive mode.

RRC connected mode (connected mode for short): The terminal device establishes an RRC connection to the network device, and data transmission may be performed.

RRC idle mode (idle mode for short): The terminal device does not establish an RRC connection to the network device, and the network device does not store a context of the terminal device. If the terminal device needs to enter the RRC connected mode from the RRC idle mode, the terminal device needs to initiate a random access process to establish an RRC connection to the network device (for example, a base station).

RRC inactive mode (or "inactive mode", "deactivated mode", or "RRC deactivated mode" for short): The terminal device previously enters the RRC connected mode, and then the base station releases the RRC connection, but the base station stores a context of the terminal device. If the terminal device needs to enter the RRC connected mode again from the RRC inactive mode, the terminal device needs to initiate an RRC connection resume process (or referred to as an RRC connection re-establishment process). Compared with the RRC connection establishment process, the RRC resume process has a shorter latency and smaller signaling overheads. However, the base station needs to store the context of the terminal device, and storage overheads of the base station are occupied.

DRX Cycle

Figure 2:
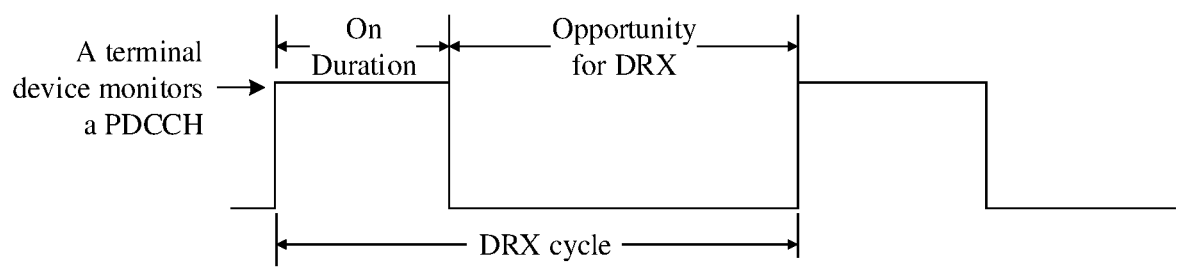
FIG. 2 is a schematic diagram of a DRX cycle according to an embodiment of this application.

When there is no data transmission between the terminal device and the network device, the terminal device is in an idle mode or an inactive mode of RRC connection. The network device wakes up the terminal device by using a paging process. After receiving a paging message, the terminal device initiates a random access process, to establish an RRC connection to the base station. Specifically, the terminal device needs to monitor a PDCCH that is used to schedule the paging message. To reduce power consumption of monitoring the PDCCH by the terminal device, DRX may be configured for the terminal device, so that the terminal device periodically wakes up to monitor the PDCCH. For example, refer to FIG. 2. A periodicity that a terminal device wakes up is a DRX cycle. The terminal device monitors a PDCCH in wake-up on duration, and a time period in which the terminal device does not monitor the PDCCH is referred to as an opportunity for DRX.

Signal Coverage Cycle

In embodiments of this application, the signal coverage cycle may be considered as an interval in which the signal coverage of the network device periodically appears in a geographic area. For example, in the communication system shown in FIG. 1, the signal coverage provided by the network device 100 for a terminal device 200 periodically occurs. As the network device 100 runs around the earth for one circle in a running orbit, for the terminal device 200, the signal coverage provided by the network device 100 appears once. The signal coverage cycle of the network device 100 may be an orbital period (OP) of the network device 100, that is, duration for which the network device 100 runs along an orbit of the network device 100 for one circle.

DRX Cycle Offset

The DRX cycle offset may represent a starting moment of the DRX cycle. For example, if the DRX cycle is T, and the DRX cycle offset is t1, a boundary of the DRX cycle is (t1+N×T), where N is a nonnegative integer. The boundary of the DRX cycle may be a starting moment of the DRX cycle.

Figure 3:
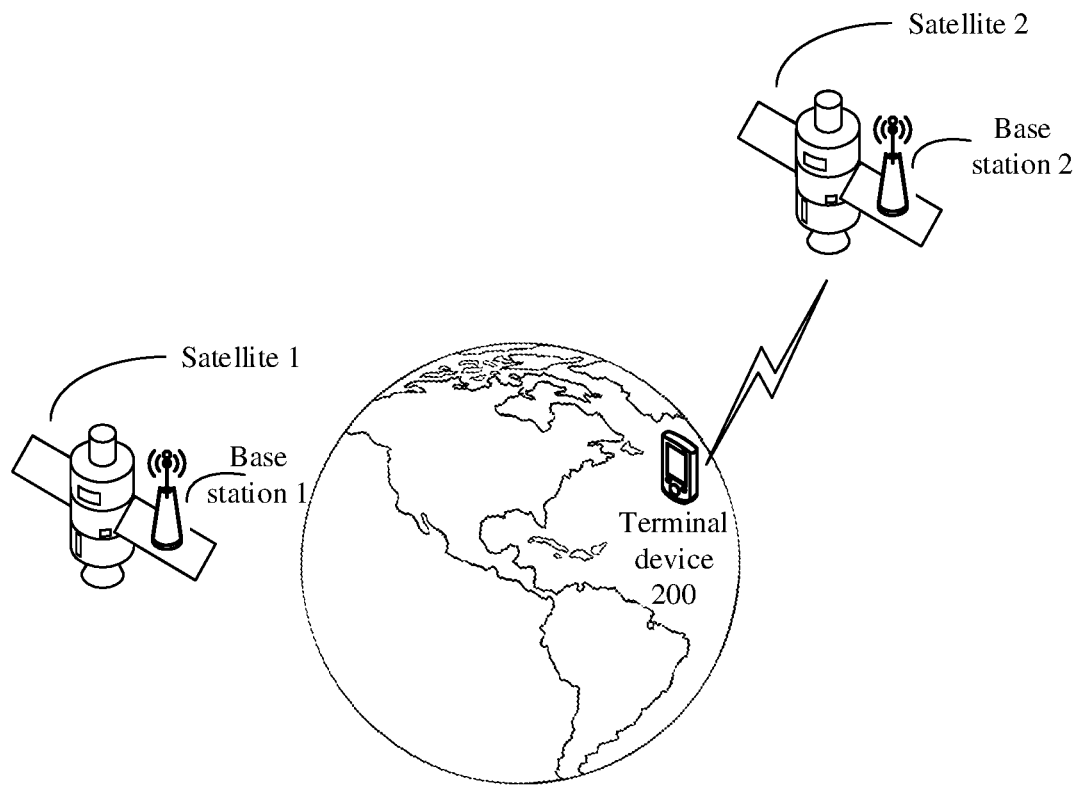
FIG. 3 is a schematic diagram in which a terminal device obtains a system message according to an embodiment of this application.

In the scenario shown in FIG. 1, to ensure that the network device can continuously serve the terminal device 200, a plurality of network devices need to be deployed to cover the earth (except a geosynchronous orbit scenario). For example, refer to FIG. 3. A base station 1 provides signal coverage for the terminal device 200 at a moment t2, and the terminal device may wake up, based on the DRX cycle, when being served by the base station 1, to obtain system information and receive a paging message. When the terminal device 200 wakes up again based on the DRX cycle, the base station 1 may run to another location on an orbit, and cannot provide the signal coverage for the terminal device 200. In this case, the base station 2 may provide the signal coverage for the terminal device. In this case, the terminal device obtains system information of the base station 2 and receives the paging message. It can be learned that when the terminal device 200 wakes up based on the DRX cycle, the terminal device 200 may experience different base stations. In this case, the terminal device 200 needs to obtain system information of the different base stations. For example, a master information block (MIB) and/or a system information block 1 (SIB1) and/or another system information block. However, frequently obtaining the system information of the base station may increase power consumption of the terminal device.

An embodiment of this application provides a paging method. A terminal device may receive a first message from a first network device (for example, a core network device), where the first message includes DRX cycle information, and the DRX cycle information is determined based on signal coverage cycle information of a second network device (for example, a base station carried on a satellite). The terminal device may receive a paging message from the second network device based on the DRX cycle information. A signal coverage cycle of the second network device indicates the signal coverage cycle provided by the second network device, for example, an orbital period of the second network device. It may be seen that in this embodiment of this application, a DRX cycle of the terminal device may be configured based on a signal coverage cycle of a base station, so that the terminal device wakes up in signal coverage of a same base station as much as possible in each DRX cycle. In this case, the terminal device does not need to obtain system information of another base station. This prevents the terminal device from frequently obtaining system information of different base stations and reduces power consumption of the terminal device.

Figure 4A:
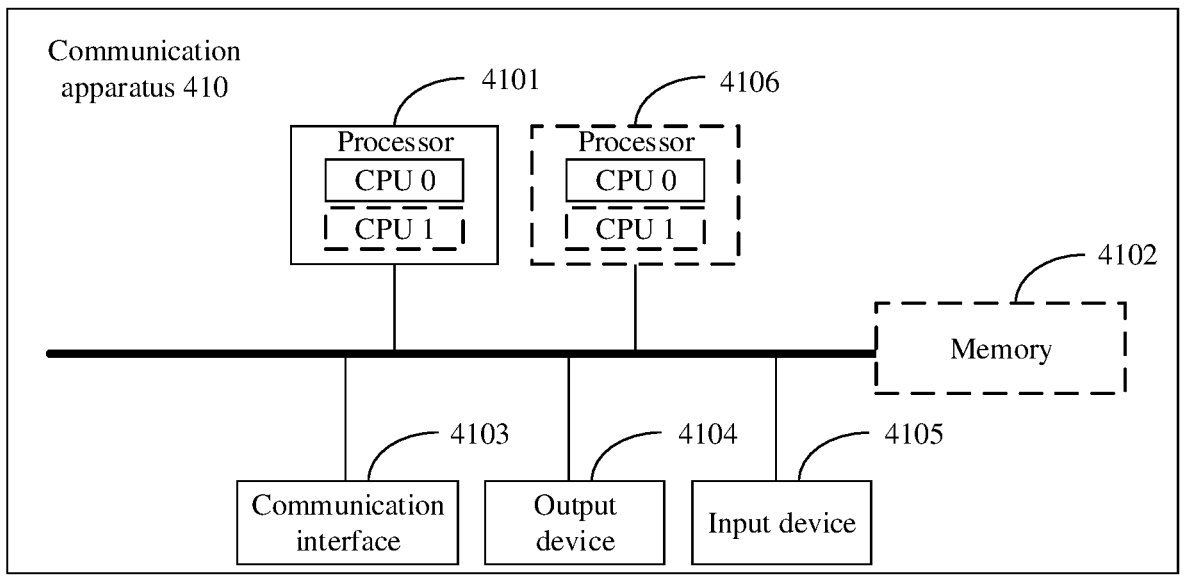
FIG. 4a is a block diagram of a structure of a communication apparatus according to an embodiment of this application.

The terminal device in embodiments of this application may be implemented by using a communication apparatus 410 in FIG. 4a. FIG. 4a is a schematic diagram of a hardware structure of a communication apparatus 410 according to an embodiment of this application. The communication apparatus 410 includes a processor 4101 and at least one communication interface (where FIG. 4a is merely an example in which a communication interface 4103 is included for description), and optionally, further includes a memory 4102. The processor 4101, the memory 4102, and the communication interface 4103 are connected to each other.

The processor 4101 may be a general-purpose central processing unit (CPU), a microprocessor, an application-specific integrated circuit (ASIC), or one or more integrated circuits configured to control program execution of the solutions in this application.

The communication interface 4103 is configured to communicate with another device or a communication network such as an Ethernet, a radio access network (RAN), or a wireless local area network (WLAN) by using any apparatus such as a transceiver.

The memory 4102 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory may exist independently, or may be connected to the processor. Alternatively, the memory may be integrated with the processor.

The memory 4102 is configured to store computer-executable instructions for executing the solutions in this application, and the execution is controlled by the processor 4101. The processor 4101 is configured to execute the computer-executable instructions stored in the memory 4102, to implement the methods provided in the following embodiments of this application.

Optionally, the computer-executable instructions in embodiments of this application may also be referred to as application program code. This is not specifically limited in embodiments of this application.

During specific implementation, in an embodiment, the processor 4101 may include one or more CPUs, for example, CPU 0 and CPU 1 in FIG. 4*a*.

During specific implementation, in an embodiment, the communication apparatus 410 may include a plurality of processors such as the processor 4101 and a processor 4106 in FIG. 4*a*. Each of these processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication apparatus 410 may further include an output device 4104 and an input device 4105. The output device 4104 communicates with the processor 4101, and may display information in a plurality of manners. For example, the output device 4104 may be a liquid crystal display (LCD), a light emitting diode (LED) display device, a cathode ray tube (CRT) display device, or a projector. The input device 4105 communicates with the processor 4101, and may receive an input from a user in a plurality of manners. For example, the input device 4105 may be a mouse, a keyboard, a touchscreen device, or a sensor device.

The communication apparatus 410 may be a general-purpose device or a special-purpose device. During specific implementation, the communication apparatus 410 may be a desktop computer, a portable computer, a network server, a personal digital assistant (PDA), a mobile phone, a tablet computer, a wireless terminal apparatus, an embedded device, or a device having a structure similar to that in FIG. 4*a*. A type of the communication apparatus 410 is not limited in this embodiment of this application.

It should be noted that the communication apparatus 410 may be an entire terminal, may be a part or component that implements a function of the terminal, or may be a communication chip, for example, a baseband chip. When the communication apparatus 410 is an entire terminal, the communication interface may be a radio frequency module. When the communication apparatus 410 is a communication chip, the communication interface 4103 may be an input/output interface circuit of the chip, where the input/output interface circuit is configured to read and output a baseband signal.

Figure 4B:
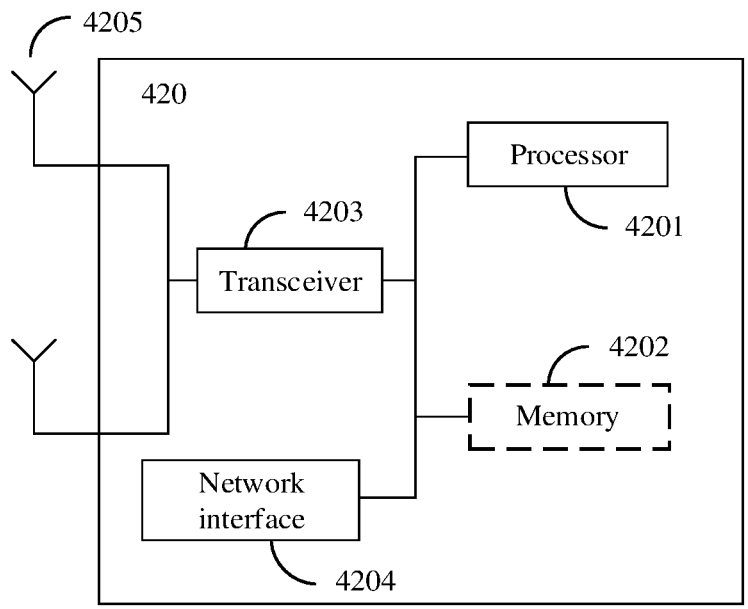
FIG. 4b is another block diagram of a structure of a communication apparatus according to an embodiment of this application.

FIG. 4*b* is a schematic diagram of a structure of a communication apparatus. For a structure of a network device 420, refer to the structure shown in FIG. 4*b*.

The network device includes at least one processor 4201, at least one transceiver 4203, at least one network interface 4204, and one or more antennas 4205. Optionally, the network device further includes at least one memory 4202. The processor 4201, the memory 4202, the transceiver 4203, and the network interface 4204 are connected, for example, through a bus. The antenna 4205 is connected to the transceiver 4203. The network interface 4204 is configured to connect the network device to another communication device by using a communication link. For example, the network device is connected to a core network element through an Si interface. In embodiments of this application, the connection may include various types of interfaces, transmission lines, buses, or the like. This is not limited in the embodiments.

A processor, for example, the processor 4201, in embodiments of this application may include at least one of a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 4201 may be a single-core (single-CPU) processor or a multi-core (multi-CPU) processor. The at least one processor 4201 may be integrated into one chip or located on a plurality of different chips.

A memory, for example, the memory 4202, in embodiments of this application may include at least one of a read-only memory (ROM), another type of static storage device that can store static information and instructions, a random access memory (RAM), another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

The memory 4202 may exist independently, and is connected to the processor 4201. Optionally, the memory 4202 may alternatively be integrated with the processor 4201, for example, integrated into one chip. The memory 4202 can store program code for executing the technical solutions in embodiments of this application, and the processor 4201 controls the execution. Various types of executed computer program code may also be considered as drivers of the processor 4201. For example, the processor 4201 is configured to execute the computer program code stored in the memory 4202, to implement the technical solutions in embodiments of this application.

The transceiver 4203 may be configured to support receiving or sending of a radio frequency signal between the network device and a terminal device, and the transceiver 4203 may be connected to the antenna 4205. Specifically, the one or more antennas 4205 may receive a radio frequency signal. The transceiver 4203 may be configured to receive the radio frequency signal from the antenna, convert the radio frequency signal into a digital baseband signal or a digital intermediate frequency signal, and provide the digital baseband signal or the digital intermediate frequency signal for the processor 4201, so that the processor 4201 further processes the digital baseband signal or the digital intermediate frequency signal, for example, performs demodulation processing and decoding processing. In addition, the transceiver 4203 may be configured to receive a modulated digital baseband signal or digital intermediate frequency signal from the processor 4201, convert the modulated digital baseband signal or digital intermediate frequency signal into a radio frequency signal, and send the radio frequency signal through the one or more antennas 4205. Specifically, the transceiver 4203 may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transceiver 4203 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals. The transceiver may be referred to as a transceiver circuit, a transceiver unit, a transceiver component, a sending circuit, a sending unit, a sending component, or the like.

It should be noted that the communication apparatus 420 may be an entire network device, may be a part or component that implements a function of the network device, or may be a communication chip. When the communication apparatus 420 is a communication chip, the transceiver 4203 may be an interface circuit of the chip, where the interface circuit is configured to read and output a baseband signal.

Embodiment 1

Figure 5:
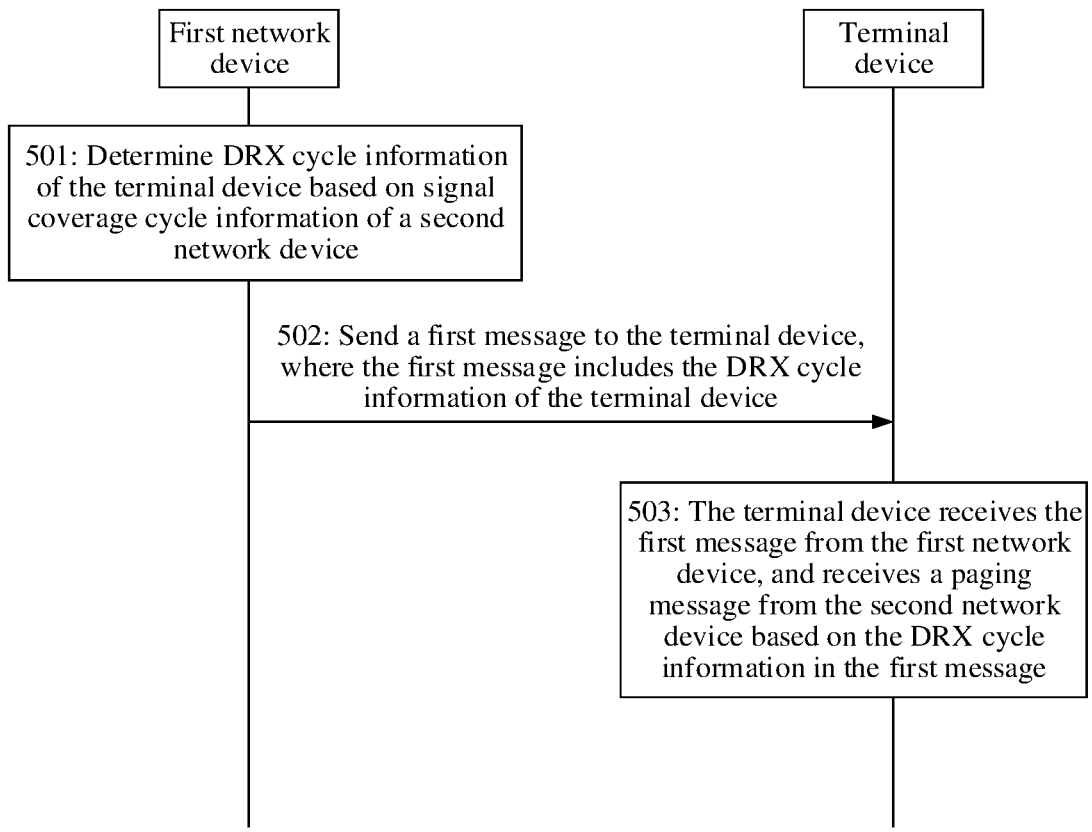
FIG. 5 is a schematic flowchart of a paging method according to an embodiment of this application.

An embodiment of this application provides a paging method. As shown in FIG. 5, the method includes the following steps.

501: A first network device determines DRX cycle information of a terminal device based on signal coverage cycle information of a second network device.

It should be noted that the signal coverage cycle information of the second network device indicates a signal coverage cycle provided by the second network device. For example, the second network device is carried on a high-altitude aircraft, and may provide periodic signal coverage for the terminal device. The second network device may be a base station. The first network device and the second network device may be a same network device. For example, the first network device and the second network device are a same base station. Alternatively, the first network device may be a core network device, and the second network device is the base station. For example, the first network device is an access and mobility management function (AMF) entity or a mobility management entity (MME).

In this embodiment of this application, the DRX cycle information of the terminal device may indicate a DRX cycle $T_{UE}$ in which the terminal device receives a paging message. The DRX cycle $T_{UE}$ of the terminal device may be determined in the following several manners.

Manner 1: The DRX cycle $T_{UE}$ is an integer multiple of the signal coverage cycle of the second network device. For example, a signal coverage cycle of the second network device is $T_S$, and the DRX cycle $T_{UE}$ of the terminal device is $K \times T_S$, where K is an integer greater than or equal to 1.

Manner 2: The DRX cycle $T_{UE}$ may be one $N^{th}$ of the signal coverage cycle of the second network device, where N is a positive integer or $N=2^M$, and M is a nonnegative integer.

In manner 2, the DRX cycle $T_{UE}$ is one $N^{th}$ of the signal coverage cycle of the second network device. To be specific, in one signal coverage cycle of the second network device, the terminal device wakes up based on the DRX cycle, and each time the terminal device wakes up, the terminal device obtains system messages of different base stations. A smaller value of N indicates a smaller quantity of times that the terminal device obtains the system messages of the different base stations. Through setting of the value of N, a quantity of base stations that the terminal device experiences when the terminal device wakes up is reduced as much as possible, thereby reducing a quantity of times that the terminal device obtains the system messages of the different base stations, and reducing power consumption of the terminal device.

Manner 3: The DRX cycle $T_{UE}$ is a configurable DRX cycle $T_q$ closest to $K \times T_S$ (that is, an integer multiple of the signal coverage cycle of the second network device). The configurable DRX cycle is a DRX cycle configurable for the terminal device. For example, the DRX cycle $T_A$ configurable for the terminal device includes $\{T_1, T_1, \ldots, T_q, \ldots, T_{Q-1}, T_Q\}$, where Q is an integer greater than or equal to 1, $1 \leq q \leq Q$, $T_{UE}=T_q$, and $T_q$ meets $|T_q-K \times T_S|$ being smallest, that is, a cycle closest to $K \times T_S$ in the DRX cycle configurable for the terminal device is $T_q$.

Manner 4: The DRX cycle $T_{UE}$ is a configurable DRX cycle $T_q$ closest to $K \times T_S$ (that is, an integer multiple of the signal coverage cycle of the second network device), and $K \times T_S \leq T_q$. That is, $T_q$ meets $|T_q-K \times T_S|$ being smallest and $K \times T_S \leq T_q$.

Manner 5: The DRX cycle $T_{UE}$ is a configurable DRX cycle $T_q$ of the terminal device closest to $K \times T_S$ (that is, an integer multiple of the signal coverage cycle of the second network device), and $T_q \leq K \times T_S$. That is, $T_q$ meets the condition $|T_q-K \times T_S|$ is the minimum value and $T_q K \times T_S$.

It should be noted that the signal coverage cycle $T_S$ of the second network device may be equal to the orbital period $T_O$ of the second network device.

502: The first network device sends a first message to the terminal device, where the first message includes the DRX cycle information of the terminal device.

In specific implementation, the first message may be an attach accept message, a registration accept message, a tracking area update accept message, an RRC connection reconfiguration message, an RRC connection release message, an RRC reconfiguration message, or an RRC release message.

503: The terminal device receives the first message from the first network device. Further, the terminal device receives a paging message from the second network device based on the DRX cycle information of the first message.

Optionally, before step 501, the method shown in FIG. 5 further includes step 501*a*. The terminal device sends a second message to the first network device, where the second message includes at least one of first duration and first information.

The first duration is determined based on the signal coverage cycle, and indicates an expected DRX cycle $T_E$ of the terminal device. In this embodiment of this application, the terminal device determines a requested DRX cycle $T_R$ based on the expected DRX cycle $T_E$. In a possible implementation, $T_E$ is equal to $T_R$.

The first information indicates a capability of the terminal device. For example, the first information indicates that the terminal device supports a DRX cycle determined based on the signal coverage cycle, or the first information indicates that the terminal device supports a DRX cycle configured based on the signal coverage cycle. It may be understood that the terminal device may request to configure the DRX cycle based on the signal coverage cycle. Alternatively, when the first network device configures the DRX cycle of the terminal device based on the signal coverage cycle, the terminal device may receive the paging message based on the DRX cycle configured by the first network device.

In specific implementation, the second message may be an attach request message, a registration request message, or a tracking area update request message.

Optionally, before step 501*a*, step 501*b* is further included. The terminal device receives fourth information from the second network device, where the fourth information indicates a signal coverage cycle $T_S$ of the second network device. The terminal device may alternatively determine the expected DRX cycle $T_E$ based on the signal coverage cycle $T_S$.

For example, the expected DRX cycle $T_E$ of the terminal device is an integer multiple of the signal coverage cycle $T_S$. For example, a signal coverage cycle of the second network device is $T_S$, and the expected DRX cycle $T_E$ of the terminal device may be $H \times T_S$, where H is an integer greater than or equal to 1. H may be equal to K described above, that is, the first network device accepts the DRX cycle $T_R$ requested by the terminal device. Alternatively, H may not be equal to K described above, that is, the first network device does not accept the DRX cycle $T_R$ requested by the terminal device. In this case, the first network device may configure the DRX cycle $T_{UE}$ for the terminal device based on the signal coverage cycle $T_S$ of the second network device.

Optionally, the second message may alternatively include type indication information, where the type indication information indicates a type of the terminal device. The type may include a low-power-consumption terminal, a low-complexity terminal, a long-term standby terminal, a machine-type terminal, an internet of things terminal, and the like.

In this embodiment of this application, the DRX may alternatively be extended DRX (eDRX).

In specific implementation, the first network device, the second network device, and the terminal device may determine, based on a starting moment of the DRX cycle, a moment for sending the paging message or a moment for receiving the paging message (method 1), or may determine, based on the DRX cycle offset, a moment for sending the paging message or a moment for receiving the paging message (method 2).

Method 1: Determine, based on the starting moment of the DRX cycle, the moment for sending the paging message or the moment for receiving the paging message.

The first network device or the second network device may determine the starting moment of the DRX cycle based on a sending moment or a receiving moment of a specified message (for example, a message 1 or a message 2 described below), and further determine, based on the DRX cycle $T_{UE}$ and the starting moment of the DRX cycle, the moment for sending the paging message, and send the paging message at the moment.

The terminal device may determine the starting moment of the DRX cycle based on the sending moment or the receiving moment of the specified message, and further determine, based on the DRX cycle $T_{UE}$ and the starting moment of the DRX cycle, the moment for receiving the paging message, and receive the paging message at the moment.

Figure 6:
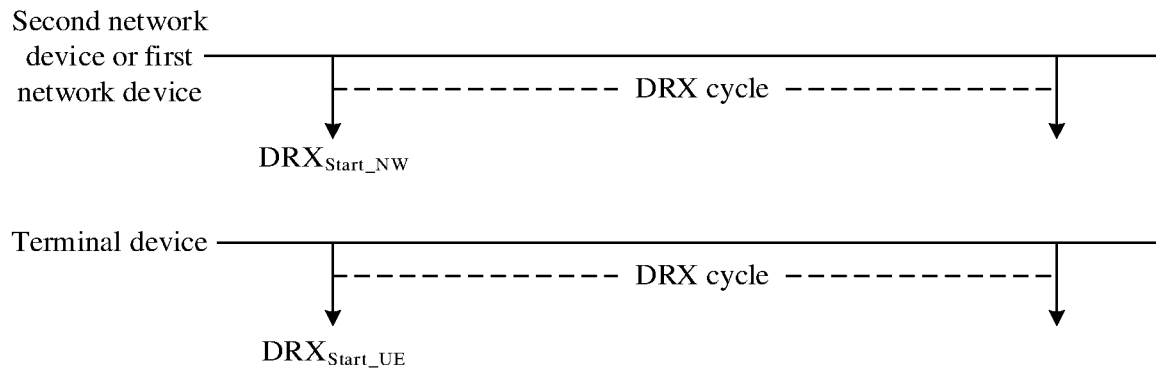
FIG. 6 is a schematic diagram of starting time of a DRX cycle according to an embodiment of this application.

In this embodiment of this application, the first network device, the second network device, and the terminal device may determine the starting moment of the DRX cycle $T_{UE}$ in the following two manners: manner (a) and manner (b). For example, refer to FIG. 6. A starting moment of the DRX cycle $T_{UE}$ determined by the first network device or the second network device is $DRX_{Start\_NW}$, and a starting moment of the DRX cycle $T_{UE}$ determined by the terminal device is $DRX_{Start\_UE}$.

Manner (a): The first network device or the second network device determines $DRX_{Start\_NW}$, based on a sending moment of a message 1, and the terminal device determines $DRX_{Start\_UE}$ based on a receiving moment of the message 1.

Specifically, a time point at which the first network device or the second network device sends the message 1 is $T_{Tx1}$, and the first network device or the second network device determines that transmission duration of the message 1 is $T_{NW1}$. In this case, the first network device or the second network device determines that $DRX_{Start\_WN}$ is $T_{Tx1}$, $T_{Tx1}$, mod $T_{UE}$, $T_{Tx1}+T_{NW1}$, or $(T_{Tx1}+T_{NW1}, \text{mod } T_{UE})$. "Mod" is a modulo operation. That is, X mod Y represents a remainder obtained after X is divided by Y.

If a time point at which the terminal device receives the message 1 is $T_{Rx1}$, and the terminal device determines that transmission duration of the message 1 is $T_{UE1}$, the terminal device determines that $DRX_{Start\_UE}$ is $T_{Rx1}$, $T_{Rx1}$ mod $T_{UE}$, $T_{Rx1}+T_{UE1}$, or $(T_{Rx1}+T_{UE1})$ mod $T_{UE}$.

The message 1 may be an earliest message sent by the second network device to the terminal device in a current RRC connection. For example, the message 1 may be a random access response (RAR) message, an RRC setup message, or an RRC resume message. Alternatively, the message 1 is a latest message sent by the second network device to the terminal device in a current RRC connection. For example, the message 1 may be an RRC release message. The "current RRC connection" is an RRC connection established between the terminal device and the second network device when step 501 is performed.

Manner (b): The first network device or the second network device determines $DRX_{Start\_NW}$ based on a receiving moment of a message 2, and the terminal device determines $DRX_{Start\_UE}$ based on a sending moment of the message 2.

A time point at which the first network device or the second network device receives the message 2 is $T_{Rx2}$, and the first network device or the second network device determines that transmission duration of the message 2 is $T_{NW2}$. In this case, the first network device or the second network device determines that $DRX_{Start\_WN}$ is $T_{Rx2}$, $T_{Rx2}$ mod $T_{UE}$, $T_{Rx2}+T_{NW2}$, or $(T_{Rx2}+T_{NW2} \text{ mod } T_{UE})$.

If a time point at which the terminal device sends the message 2 is $T_{Tx2}$, and the terminal device determines that transmission duration of the message 2 is $T_{UE2}$, the terminal device determines that $DRX_{Start\_UE}$ is $T_{Tx2}$, $T_{Tx2}$, mod $T_{UE}$, $T_{Tx2}+T_{UE2}$, or $(T_{Tx2}+T_{UE2})$ mod $T_{UE}$.

The message 2 may be an earliest message that is received by the second network device from the terminal device in the current RRC connection. For example, the message 2 is a preamble, an RRC request message, or an RRC resume request message. Alternatively, the message 2 is a latest message sent by the terminal device to the second network device in the current RRC connection. For example, the message 2 is an acknowledgment of an RRC release.

In specific implementation, the first network device or the second network device determines $DRX_{Start\_NW}$ in the foregoing manner (a) or manner (b), to determine time t'32 $(DRX_{Start\_NW}+R \times T_{UE})$ mod $T_C$ for sending the paging message, and the terminal device determines $DRX_{Start\_UE}$ in the foregoing manner (a) or manner (b), to determine time t'=$(DRX_{Start\_UE}+R \times T_{UE})$ for receiving the paging message, where R is an integer.

In a possible implementation, R may be a count value maintained by the first network device and/or the second network device and/or the terminal device. R may indicate a quantity of DRX cycles. Specifically, for the terminal device, R may indicate a quantity of passed DRX cycles that start from receiving the first message by the terminal device, or R indicates a quantity of passed DRX cycles that start from sending the second message by the terminal device. For the first network device or the second network device, R may indicate a quantity of passed DRX cycles that start from sending the first message by the first network device or the second network device, or R indicates a quantity of passed DRX cycles that start from receiving the second message by the first network device or the second network device. An initial value of the count value R may be o or 1.

In a possible implementation, when the first network device or the second network device sends the first message to the terminal device, R is set to an initial value. Alternatively, when the first network device or the second network device updates a DRX cycle, R is set to an initial value, or when the first network device or the second network device uses a new DRX cycle to determine time for sending the paging message, and the terminal device uses a new DRX cycle to determine time for receiving the paging message, R is set to an initial value. Alternatively, when a count value R of the terminal device reaches a first threshold maintained by the terminal device, the terminal device sets R to an initial value, or when a count value R of the first network device reaches a second threshold maintained by the first network device, the first network device sets R to an initial value. The first threshold may be equal to the second threshold.

$T_C$ is a system time cycle. For example, a unit $DRX_{Start\_NW}$ may be a subframe or millisecond, and the $T_C$ may be 1024 system frames, that is, 10240 milliseconds, or the $T_C$ may be 1024 hyper frames, that is, 1024×1024×10 milliseconds.

In the method provided in this embodiment of this application, the count value R is set, so that the network device easily determines the quantity of passed DRX cycles, to calculate, based on the quantity of passed DRX cycles, the time for sending the paging message. Alternatively, the terminal device may determine, based on the count value R, the quantity of passed DRX cycles, to calculate, based on the quantity of passed DRX cycles, time for receiving the paging message, and this implements time synchronization between the network device and the terminal device, and ensures paging reliability.

Method 2: Determine, based on the DRX cycle offset, a moment for sending the paging message or a moment for receiving the paging message.

Optionally, the method shown in FIG. 5 further includes, before step 501, the terminal device sends the second message to the first network device, where the second message may include second information. The second information indicates the DRX cycle $T_R$ or a first offset Offset 1 of the DRX cycle $T_E$. It should be noted that the first offset Offset 1 is an offset of the DRX cycle $T_R$ requested by the terminal device.

In specific implementation, the second message may be an attach request message, a registration request message, or a tracking area update request message.

Optionally, the first message further includes third information, where the third information indicates a second offset Offset 2 of the DRX cycle $T_{UE}$. The second offset Offset 2 is an offset configured by the first network device for the terminal device. The first network device may accept a first offset requested by the terminal device, that is, the second offset Offset 2 may be equal to the first offset Offset 1. Alternatively, the first network device may reconfigure the offset for the terminal device. For example, the second offset Offset 2 is not equal to the first offset Offset 1.

It should be noted that, when the first network device accepts the first offset requested by the terminal device, the first network device may not send the Offset 2 to the terminal device, and the DRX cycle offset configured by the first network device for the terminal device is the first offset requested by the terminal device by default.

When the first network device configures the DRX cycle offset (for example, the second offset Offset 2 in this embodiment of this application) for the terminal device, the first network device may send the DRX cycle $T_{UE}$ and the second offset Offset 2 to the second network device, and the second network device determines, based on the DRX cycle $T_{UE}$ and the second offset Offset 2, time t' for sending the paging message. The second network device sends the paging message to the terminal device at the time t'.

The terminal device determines time t' based on the DRX cycle $T_{UE}$ and the second offset Offset 2, and receives the paging message sent by the second network device at the time t'.

Specifically, the time t'=(Offset 2+R×$T_{UE}$) mod $T_C$, or the time t' is system time $t_S$ that satisfies the formula ($t_S$+Offset 2) mod $T_{UE}$=UE-ID mod $T_{UE}$. In the equation, $t_S$ may be a system frame number (SFN), a hyper system frame number (H-SFN), or a sub-frame number (SF), and UE-ID is an identifier of the UE or is generated based on the identifier of the UE.

In a possible implementation, when the first network device accepts the first offset Offset 1 requested by the terminal device, it may be considered that the Offset 2 is equal to the Offset 1, the second network device may determine, based on the DRX cycle $T_{UE}$ and the first offset Offset 1, the time t' for sending the paging message, and the terminal device may determine, based on the DRX cycle $T_{UE}$ and the first offset Offset 1, the time t' for receiving the paging message.

Specifically, the time t'=(Offset 1+R*$T_{UE}$) mod $T_C$. Alternatively, the time t' is system time $t_S$ that satisfies the formula ($t_S$+Offset 1) mod $T_{UE}$=UE-ID mod $T_{UE}$.

It should be noted that the Offset 1 and the Offset 2 may be in units of a system frame, a hyper frame, or a subframe.

Embodiment 2

An embodiment of this application further provides a paging method. A terminal device may request a DRX cycle from an AMF based on an orbital period of a base station, and the DRX cycle requested by the terminal device is an integer multiple of the orbital period of the base station. According to the request of the terminal device, a DRX cycle configured by the AMF for the terminal device is an integer multiple of the orbital period of the base station, so that the terminal device is served by a same base station when the terminal device is woken up, and power consumption of reading a system message by the terminal device is reduced.

Figure 7:
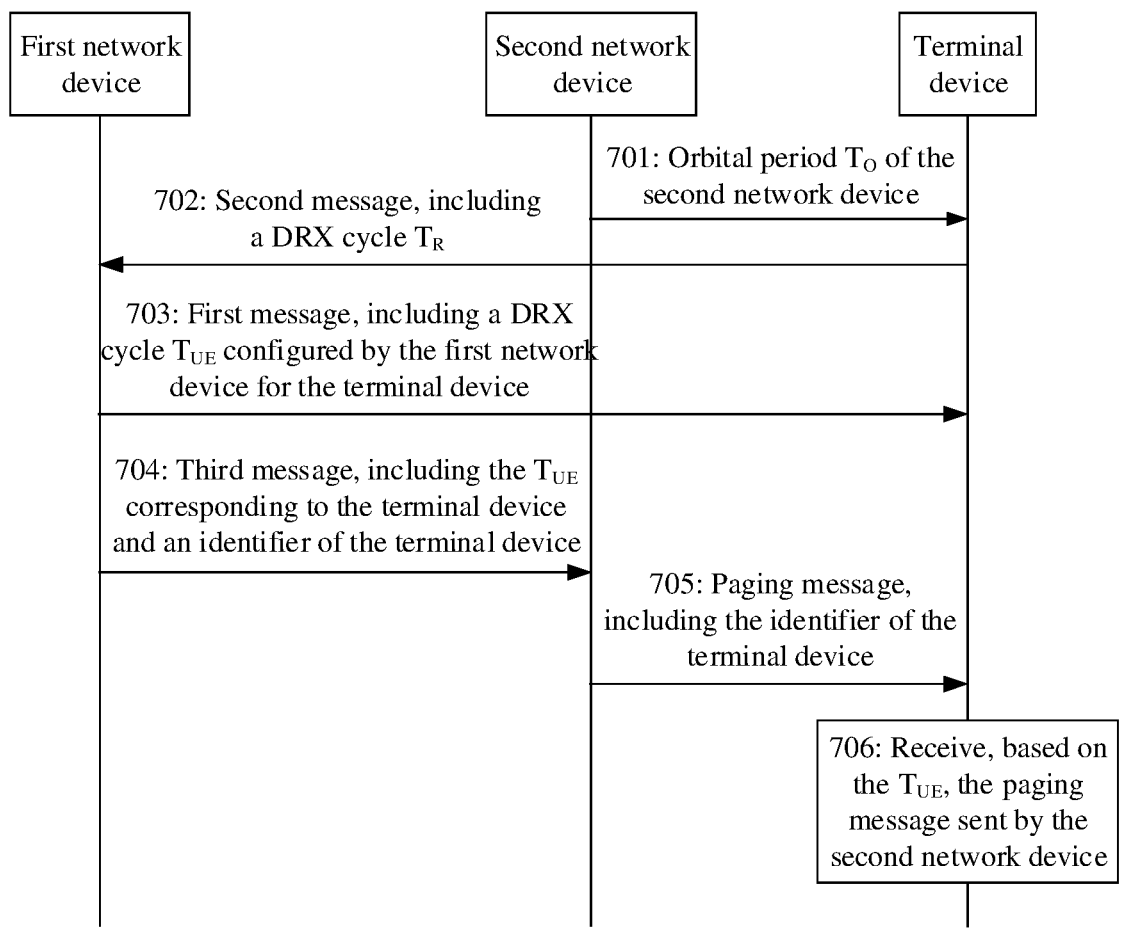
FIG. 7 is another schematic flowchart of a paging method according to an embodiment of this application.

The following describes in detail the paging method provided in this embodiment of this application with reference to a specific example. Refer to FIG. 7. The method includes the following steps.

701. A second network device sends an orbital period $T_O$ of the second network device to a terminal device.

It should be noted that the second network device provides signal coverage for the terminal device. For example, the second network device is a network device 100 shown in FIG. 1. In a possible implementation, the second network device is a base station. The $T_O$ may be considered as a signal coverage cycle $T_S$ of the second network device.

In a possible implementation, the second network device sends the $T_O$ to the terminal device by using a system message or dedicated signaling. It may be understood that the $T_O$ is included in the system message or the dedicated signaling.

702: The terminal device sends a second message to a first network device, where the second message includes a DRX cycle $T_R$ requested by the terminal device.

The first network device may be a core network device, and the terminal device needs to communicate with the core network device by using the base station. For example, the first network device is a network device 101 shown in FIG. 1. In a possible implementation, the first network device is the AMF. To be specific, the terminal device sends the second message to the second network device, and the second network device may forward the second message to the first network device. The second message may be used to request to register with the first network device.

It should be noted that the DRX cycle $T_R$ requested by the terminal device may be an integer multiple of the orbital period $T_O$. For example, $T_R = T_O \times H$, where H is an integer greater than or equal to 1.

In a possible implementation, the second message may be an attach request message, a registration request message, or a tracking area update request message.

Optionally, the second message may alternatively include type indication information, where the type indication information indicates a type of the terminal device. The type may include a low-power-consumption terminal, a low-complexity terminal, a long-term standby terminal, a machine-type terminal, an internet of things terminal, or the like.

Optionally, the second message may alternatively include first information, where the first information indicates a capability of the terminal device. For details, refer to the definition of the first information in Embodiment 1. Details are not described herein again.

703: The first network device sends a first message to the terminal device, where the first message includes a DRX cycle $T_{UE}$ configured by the first network device for the terminal device.

It should be noted that the DRX cycle $T_{UE}$ configured by the first network device for the terminal device may be an integer multiple of the orbital period $T_O$. For example, $T_{UE} = K \times T_O$, where K is an integer greater than or equal to 1, and K may be equal to or not equal to H.

In a possible implementation, the first message may be an attach accept message, a registration request message, or a tracking area update accept message.

Optionally, the first message may alternatively include first indication information, where the first indication information indicates that the first network device accepts the DRX cycle $T_R$ requested by the terminal device. In this implementation, the first message may not include the $T_{UE}$, and the terminal device determines that the $T_{UE}$ is equal to the $T_R$.

Optionally, the first indication information may be an implicit indication, to be specific, if the terminal device receives the first message, it indicates that the second network device accepts the DRX cycle requested by the terminal device.

704: The first network device sends a third message to the second network device, where the third message includes the $T_{UE}$ corresponding to the terminal device and an identifier of the terminal device.

It should be noted that the $T_{UE}$ is duration of a DRX cycle configured by the first network device for the terminal device. When the first network device and the second network device are a same device, for example, the first network device and the second network device are a same base station, step 704 may be omitted, and step 705 is directly performed.

705: The second network device sends a paging message to the terminal device, where the paging message includes the identifier of the terminal device.

In specific implementation, the second network device may send the paging message based on the $T_{UE}$. For example, the second network device starts a timer $Timer_{NW}$ at $DRX_{Start\_NW}$, where duration of the $Timer_{NW}$ is the $T_{UE}$, and $DRX_{Start\_NW}$ is a starting moment of the DRX cycle determined by the second network device.

In a possible implementation, the second network device sends the paging message when the $Timer_{NW}$ times out, and when the $Timer_{NW}$ times out, the second network device restarts the $Timer_{NW}$.

It should be noted that, for specific implementation of $DRX_{Start\_NW}$, refer to the foregoing detailed descriptions of the embodiment shown in FIG. 5. Details are not described herein again.

In addition, the time at which the second network device sends the paging message when the $Timer_{NW}$ times out is t'. For specific implementation of t', refer to the foregoing detailed descriptions of the embodiment shown in FIG. 5. For example, the second network device determines the time $t' = (DRX_{Start\_NW} + R \times T_{UE})$ mod $T_C$ for sending the paging message.

Alternatively, the second network device determines, based on the DRX cycle offset (namely, the second offset Offset 2 described in Embodiment 1 of this application) of the first network device for the terminal device, the moment t' for sending the paging message.

For example, the $t' = (Offset\ 2 + R \times T_{UE})$ mod $T_C$, or the time t' is system time $t_S$ that satisfies the formula $(t_S + Offset\ 2)$ mod $T_{UE}$-ID mod $T_{UE}$. For details, refer to Embodiment 1.

706: The terminal device receives, based on the $T_{UE}$, the paging message sent by the second network device.

In specific implementation, the terminal device starts a timer $Timer_{UE}$ at $DRX_{Start\_UE}$. Duration of the $Timer_{UE}$ is $T_{UE}$, and $DRX_{Start\_UE}$ is the starting moment of the DRX cycle determined by the terminal device.

In a possible implementation, when the $TimerT_{UE}$ expires, the terminal device receives the paging message sent by the second network device, and restarts the $Timer_{UE}$.

It should be noted that, for specific implementation of $DRX_{Start\_UE}$, refer to the foregoing detailed descriptions of the embodiment shown in FIG. 5. Details are not described herein again.

Time at which the terminal device receives the paging message when the $TimerT_{UE}$ times out is t'. For specific implementation of t', refer to the foregoing detailed descriptions of the embodiment shown in FIG. 5. For example, the terminal device determines the time $t' = (DRX_{Start\_UE} + R \times T_{UE})$ mod $T_C$ for receiving the paging message. For details, refer to Embodiment 1.

Alternatively, the terminal device determines, based on the DRX cycle offset (namely, the second offset Offset 2 described in this embodiment of this application), the moment t' for sending the paging message. For details, refer to Embodiment 1.

For example, $t' = (Offset\ 2 + R \times T_{UE})$ mod $T_C$, or the time t' is system time $t_S$ that satisfies the formula $(t_S + Offset\ 2)$ mod $T_{UE} = UE$-ID mod $T_{UE}$. For details, refer to Embodiment 1.

It should be noted that step 701 is an optional step. To be specific, the terminal device may pre-store the $T_O$ of the second network device, the second network device may not send the $T_O$ to the terminal device, and the terminal device may request the DRX cycle from the first network device based on the pre-stored $T_O$.

Embodiment 3

An embodiment of this application further provides a paging method. A terminal device may request a DRX cycle and a DRX cycle offset from an AMF based on an orbital period of a base station, and the DRX cycle requested by the terminal device is an integer multiple of the orbital period of the base station. According to the request of the terminal device, the DRX cycle configured by the AMF for the terminal device is an integer multiple of the orbital period of the base station, and the AMF further configures the DRX cycle offset for the terminal device, so that the terminal device is served by a same base station when the terminal device is woken up, and power consumption of reading a system message by the terminal device is reduced. In addition, the terminal device may alternatively determine, based on a DRX cycle offset, a moment for receiving a paging message, to ensure paging reliability.

Figure 8:
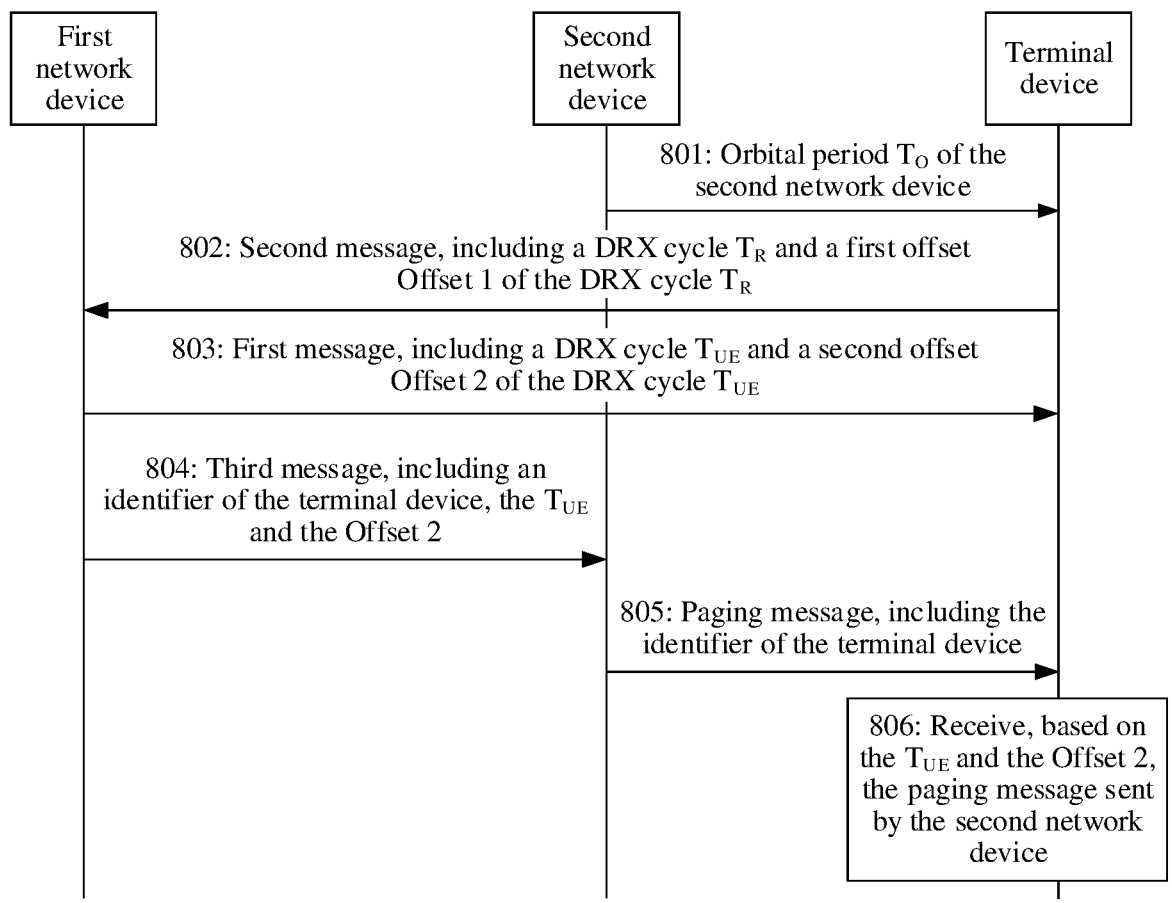
FIG. 8 is another schematic flowchart of a paging method according to an embodiment of this application.

The following describes in detail the paging method provided in this embodiment of this application with reference to a specific example. As shown in FIG. 8, the method includes the following steps.

801: A second network device sends an orbital period $T_O$ of the second network device to the terminal device.

It should be noted that the second network device provides signal coverage for the terminal device. For example, the second network device is a network device 100 shown in FIG. 1. In a possible implementation, the second network device is a base station. For detailed explanations of step 801, refer to the foregoing related descriptions of step 701. Details are not described herein again. The $T_O$ may be considered as a signal coverage cycle $T_S$ of the second network device.

802: The terminal device sends a second message to a first network device, where the second message includes a DRX cycle $T_R$ requested by the terminal device and a first offset Offset 1 of the DRX cycle $T_R$ requested by the terminal device.

The first network device may be a core network device, and the terminal device needs to communicate with the core network device by using the base station. For example, the first network device is a network device 101 shown in FIG. 1. In a possible implementation, the first network device is the AMF.

It should be noted that for detailed explanations of step 802, refer to related descriptions of step 702. It is different from step 702 that, in step 802, in addition to the DRX cycle $T_R$ requested by the terminal device, the second message further includes the first offset Offset 1 of the DRX cycle requested by the terminal device.

In a possible implementation, Offset 1=$DRX_{Start\_UE}$, and a unit of the Offset 1 may be a hyper frame, a system frame, or a subframe (that is, ms).

Optionally, the second message may alternatively include type indication information, where the type indication information indicates a type of the terminal device. The type may include a low-power-consumption terminal, a low-complexity terminal, a long-term standby terminal, a machine-type terminal, an internet of things terminal, or the like.

Optionally, the second message may alternatively include first information, where the first information indicates a capability of the terminal device. For details, refer to the descriptions of the first information in Embodiment 1. Details are not described herein again.

803: The first network device sends a first message to the terminal device, where the first message includes a DRX cycle $T_{UE}$ configured by the first network device for the terminal device and a second offset Offset 2 of the DRX cycle $T_{UE}$ configured by the first network device for the terminal device.

Optionally, the first message may alternatively include second indication information, where the second indication information indicates that the first network device accepts the DRX cycle $T_R$ requested by the terminal device and the first offset Offset 1 of the DRX cycle requested by the terminal device. In this implementation, the first message may not include the $T_{UE}$ and the second offset Offset 2 of the DRX cycle. The DRX cycle $T_{UE}$ that is actually used by the terminal device to receive the paging message is $T_R$, and the second offset of the DRX cycle is Offset 2.

Optionally, the second indication information may be an implicit indication, to be specific, if the terminal device receives the first message, it indicates that the second network device accepts the DRX cycle $T_R$ and the first offset Offset 1 of the DRX cycle that are requested by the terminal device.

Optionally, the Offset 1 is equal to the Offset 2.

804: The first network device sends a third message to the second network device, where the third message includes an identifier of the terminal device, the $T_{UE}$ and the Offset 2.

It should be noted that the $T_{UE}$ is duration of a DRX cycle configured by the first network device for the terminal device, and the Offset 2 is a DRX cycle offset configured by the second network device for the terminal device. When the first network device and the second network device are a same device, for example, the first network device and the second network device are a same base station, step 804 may be omitted, and step 805 is directly performed.

805: The second network device sends, based on the $T_{UE}$ and the Offset 2, the paging message to the terminal device, where the paging message includes the identifier of the terminal device.

For details, refer to the foregoing embodiment. For example, the time at which the second network device sends the paging message is t'. For specific implementation of t', refer to the foregoing detailed descriptions of the embodiment shown in FIG. 5. For example, t'=(Offset 2+R×$T_{UR}$) mod $T_C$, or the time t' is system time $t_S$ that satisfies the formula ($t_S$+Offset 2) mod $T_{UE}$=UE-ID mod $T_{UE}$.

806: The terminal device receives, based on the $T_{UE}$ and the Offset 2, the paging message sent by the second network device.

For details, refer to the foregoing embodiment. The time at which the terminal device receives the paging message is t'. For specific implementation of t', refer to the foregoing detailed descriptions of the embodiment shown in FIG. 5. For example, the time t'=(Offset 2+R×$T_{UE}$) mod $T_C$, or the time t' is system time $t_S$ that satisfies the formula ($t_S$+Offset 2) mod $T_{UE}$=UE-ID mod $T_{UE}$.

Embodiment 4

An embodiment of this application further provides a paging method. A terminal device and an AMF may exchange a configurable DRX cycle $T_{Con}$. The terminal device may request a DRX cycle (which may be an integer multiple of an orbital period or $T_{Con}$) from the AMF based on the orbital period of a base station. According to the request of the terminal device, the DRX cycle configured by the AMF for the terminal device is the $T_{Con}$ closest to an integer multiple of the orbital period of the base station, so that the terminal device is served by a same base station when the terminal device is woken up, and power consumption of reading a system message by the terminal device is reduced. In addition, the terminal device may alternatively determine, based on a DRX cycle offset, a moment for receiving a paging message, to ensure paging reliability.

Figure 9:
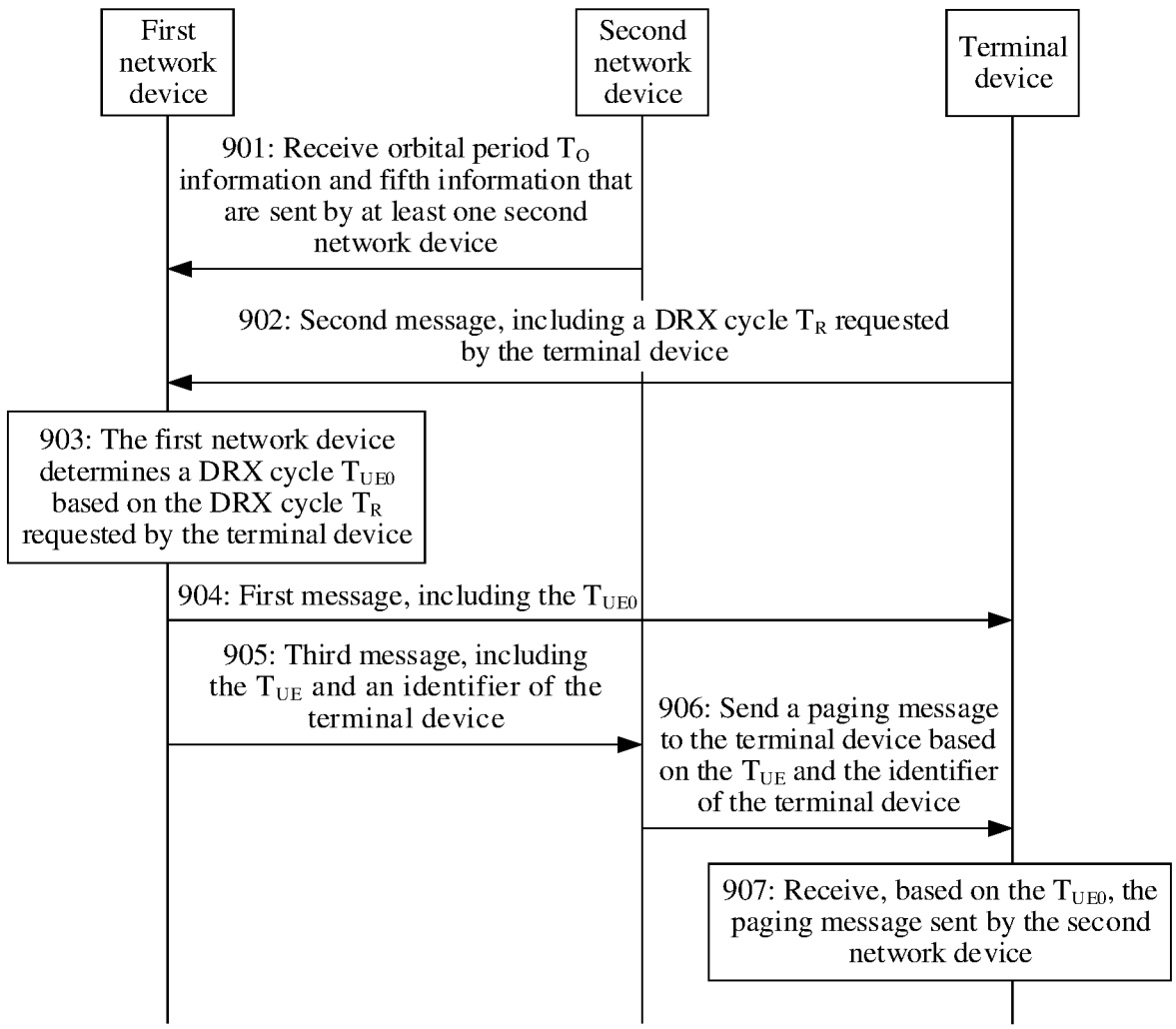
FIG. 9 is another schematic flowchart of a paging method according to an embodiment of this application.

An embodiment of this application further provides a paging method. As shown in FIG. 9, the method includes the following steps.

901: A first network device receives orbital period $T_O$ information and fifth information that are sent by at least one second network device.

The first network device may be a core network device, and the terminal device needs to communicate with the core network device by using the base station. For example, the first network device is a network device 101 shown in FIG. 1. In a possible implementation, the first network device is the AMF. In a possible implementation, the fifth information includes a cell identifier of a second network device and/or an identifier of the second network device, and the orbital period $T_O$ information indicates a signal coverage cycle $T_S$ of the second network device.

The first network device may store the $T_O$ and the fifth information that are sent by the at least one second network device. In a possible implementation, the first network device maintains Table 1 and/or Table 2, and records the $T_O$ and the fifth information that are reported by the at least one second network device.

TABLE 1

| Identifier of network device | $T_O$ |
|---|---|
| A | $T_{OA}$ |
| B | $T_{OB}$ |
| . . . | . . . |

TABLE 2

| $T_O$ | Cell identifier of the network device |
|---|---|
| $T_{OA}$ | $Cell_{A1}$, $Cell_{A2}$, . . . |
| $T_{OB}$ | $Cell_{B1}$, $Cell_{B2}$, . . . |
| . . . | . . . |

It should be noted that, step 901 is an optional step, and the first network device may pre-configure Table 1 and/or Table 2, so that the first network device does not need to determine the orbital period information and the fifth information by receiving a message from the second network device.

902: The terminal device sends a second message to the first network device, where the second message includes a DRX cycle $T_R$ requested by the terminal device.

In a possible implementation, the terminal device may alternatively send third indication information to the first network device, where the third indication information may indicate at least one of an identifier of the second network device, a cell identifier, where the cell identifier may be a cell identifier of a coverage cell of the second network device, the terminal device requests to configure a DRX cycle based on an orbital period, and the terminal device requests to configure a DRX cycle based on a signal coverage cycle.

In specific implementation, the first network device determines the orbital period $T_O$ based on the identifier of the second network device and Table 1. The first network device may determine the orbital period $T_O$ based on the cell identifier and Table 2. The first network device may alternatively determine a requirement of the terminal device based on the third indication information. For example, the terminal device requests to configure the DRX cycle based on the orbital period, and the first network device may configure the DRX cycle based on the orbital period, or the terminal device requests to configure the DRX cycle based on the signal coverage cycle, and the first network device may configure the DRX cycle based on the signal coverage cycle.

It should be noted that the second network device in step 902 is a network device that provides signal coverage for the terminal device. For example, the second network device is a network device 100 shown in FIG. 1. In a possible implementation, the second network device is the base station.

Optionally, the second message may alternatively include type indication information, where the type indication information indicates a type of the terminal device. The type may include a low-power-consumption terminal, a low-complexity terminal, a long-term standby terminal, a machine-type terminal, an internet of things terminal, or the like.

Optionally, the second message may alternatively include first information, where the first information indicates a capability of the terminal device. For details, refer to the descriptions of the first information in Embodiment 1. Details are not described herein again.

In this application, the configurable DRX cycle $T_{Con}$ may be understood as a configurable DRX cycle in a land communication scenario, or may be understood as a configurable DRX cycle in a non-satellite communication scenario, or may be understood as a configurable DRX cycle in a scenario in which signal coverage is aperiodically provided.

In a possible implementation method, $T_R$ is a configurable DRX cycle.

In a possible implementation method, $T_R$ is $L \times T_O$. L is an integer greater than or equal to 1.

903: The first network device determines a DRX cycle $T_{UEo}$ based on the DRX cycle $T_R$ requested by the terminal device.

In a possible implementation method, the DRX cycle $T_{UEo}$ is a DRX cycle selected by the first network device from the configurable DRX cycle $T_{Con}$ of the terminal device based on the DRX cycle $T_R$ requested by the terminal device.

It should be noted that the terminal device and the first network device support exchanging a configurable DRX cycle $T_{Con}$, but the configurable DRX cycle $T_{Con}$ may not be an integer multiple of the orbital period $T_O$. The terminal device and the first network device may determine, by exchanging the configurable DRX cycle $T_{Con}$, an actually used DRX cycle $T_{UE}$ when a paging message is monitored and sent. For example, the first network device determines the configurable DRX cycle $T_{UEo}$ based on the DRX cycle $T_R$ requested by the terminal device, the first network device sends the configurable DRX cycle $T_{UEo}$ to the terminal device, and the terminal device determines the actually used DRX cycle $T_{UE}$ based on the $T_{UEo}$ from the first network device.

In a possible implementation method, if the DRX cycle $T_R$ requested by the terminal device is a configurable DRX cycle, the first network device may determine, by using the following methods, the DRX cycle $T_{UEo}$ to be sent to the terminal device.

Method 1: The first network device determines $T_{UE}=L \times T_O$ based on the third indication information and the $T_R$, and sends $T_{UEo}$ to the terminal device, where $T_{UEo}=T_{UE}$. In a possible implementation method, the first network device determines, based on the third indication information and Table 1 or Table 2, the $T_O$ corresponding to the second network device, then determines $T_{UE}=L \times T_O$ based on the $T_R$, and sends the $T_{UEo}$ to the terminal device, where $T_{UEo}=T_{UE}$. In a possible implementation method, the first network device determines that (L×$T_O$) is closest to the $T_R$. It may be understood that, (L×$T_O$) is an integer multiple of the orbital period closest to the $T_R$.

Method 2: The first network device determines $T_{UE}$=L× $T_O$ based on the third indication information and the $T_R$, and sends the $T_{UEo}$ to the terminal device, where the $T_{UEo}$ is a configurable DRX cycle, and the $T_{UEo}$ is closest to L×$T_O$. In a possible implementation method, the first network device queries Table 1 or Table 2 based on the third indication information, to determine the $T_O$ corresponding to the second network device, then determines $T_{UE}$=L×$T_O$ based on the $T_R$, and sends the $T_{UEo}$ to the terminal device, where $T_{UEo}$ is closest to L×$T_O$. In a possible implementation method, the first network device determines that (L×$T_O$) is closest to the $T_R$. It can be understood that, (L×$T_O$) is an integer multiple of the orbital period closest to the $T_R$.

In a possible implementation method, if the DRX cycle $T_R$ requested by the terminal device is L×$T_O$, the first network device may determine, by using the following methods, the DRX cycle $T_{UE}$ to be sent to the terminal device.

Method 1: The first network device determines $T_{UE}$=L× $T_O$ based on the third indication information and the $T_R$, and sends the $T_{UEo}$ to the terminal device, where $T_{UEo}$=$T_{UE}$. In a possible implementation method, the first network device queries Table 1 or Table 2 based on the third indication information, to determine the $T_O$ corresponding to the second network device, then determines $T_{UE}$=L×$T_O$ based on the $T_R$, and sends the $T_{UEo}$ to the terminal device, where $T_{UEo}$=$T_{UE}$.

Method 2: The first network device determines $T_{UE}$=L× T×$_O$ based on the third indication information and the $T_R$, and sends the $T_{UEo}$ to the terminal device, where the $T_{UEo}$ is a configurable DRX cycle, and the $T_{UEo}$ is closest to L×$T_O$. In a possible implementation method, the first network device queries Table 1 or Table 2 based on the third indication information, to determine the $T_O$ corresponding to the second network device, then determines $T_{UE}$=L×$T_O$ based on the $T_R$, and sends the $T_{UEo}$ to the terminal device, where $T_{UEo}$ is closest to L×$T_O$.

In a possible implementation, the first network device may determine the DRX cycle $T_{UE}$ of the terminal device based on the orbital period $T_O$ of the second network device.

For example, the first network device searches, based on the third indication information, for the $T_O$ corresponding to the at least one second network device. For example, the identifier of the second network device reported by the terminal device is "A", and the first network device may determine that the $T_O$ corresponding to the second network device is $T_{OA}$ by querying Table 1 or Table 2.

904: The first network device sends a first message to the terminal device, where the first message includes the $T_{UEo}$.

905: The first network device sends the third message to the second network device, where the third message includes an identifier of the terminal device, and the $T_{UE}$.

906: The second network device sends the paging message to the terminal device based on the $T_{UE}$ and the identifier of the terminal device.

Specifically, for specific implementation of determining the $T_{UE}$ by the second network device, refer to step 903. Details are not described herein again. Alternatively, with reference to Manner 1 or Manner 2 described in Embodiment 1, the second network device may determine, based on the $T_{UE}$, a moment for sending the paging message. Details are not described herein again.

907: The terminal device receives, based on the $T_{UEo}$, the paging message sent by the second network device.

In specific implementation, the terminal device may determine the $T_{UE}$ based on the $T_{UEo}$, where $T_{UE}$=×L=$T_O$, and the $T_{UE}$ is an integer multiple of the orbital period closest to the $T_{UEo}$. Alternatively, with reference to Manner 1 or Manner 2 described in Embodiment 1, the terminal device may determine, based on the $T_{UE}$, the moment for receiving the paging message. Details are not described herein again.

Method 1 and method 2 in Embodiment 1 and content related to the second message are applicable to this embodiment.

In the method shown in FIG. 9, a DRX cycle is configured for the terminal device based on the orbital period of the base station, so that the terminal device is served by a same base station when the terminal device is woken up, and power consumption of reading a system message by the terminal device is reduced. In addition, sending $T_O$ to the terminal device by the second network device is reduced, and transmitting the $T_O$ in a broadcast message is avoided, and this improves communication security.

Figure 10:
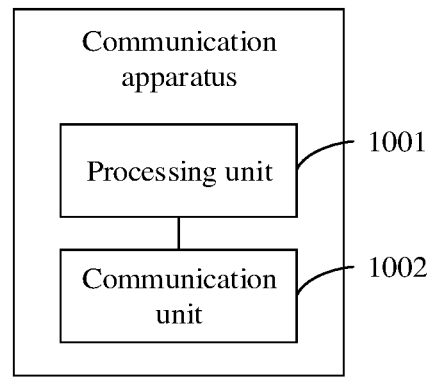
FIG. 10 to FIG. 13 each are another block diagram of a structure of a communication apparatus according to an embodiment of this application.

When each function module is obtained through division based on each corresponding function, FIG. 10 is a possible schematic diagram of a structure of the communication apparatus in the foregoing embodiments. The communication apparatus shown in FIG. 10 may be the terminal device in embodiments of this application, may be a component that implements the foregoing methods in the terminal device, or may be a chip used in the terminal device. The chip may be a system-on-a-chip (SOC), a baseband chip having a communication function, or the like. As shown in FIG. 10, the communication apparatus includes a processing unit 1001 and a communication unit 1002. The processing unit may be one or more processors, and the communication unit may be a transceiver.

The processing unit 1001 is configured to support the terminal device in performing step 503, step 706, step 806, and step 907, and/or is configured to perform another process of the technology described in this specification.

The communication unit 1002 is configured to support communication between the terminal device and another communication apparatus, for example, support the terminal device in performing step 502, step 701 to step 703, step 705, step 801 to step 803, step 805, step 902, step 904, and step 906, and/or is configured to perform another process of the technology described in this specification.

It should be noted that all related content of the steps in the foregoing method embodiments may be cited in function descriptions of corresponding function modules. Details are not described herein again.

Figure 11:
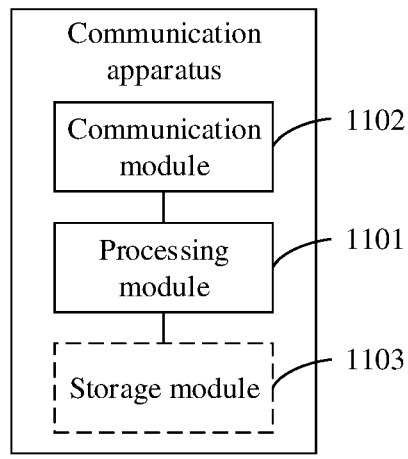

For example, when an integrated unit is used, FIG. 11 is a schematic diagram of a structure of a communication apparatus according to an embodiment of this application. In FIG. 11, the communication apparatus includes a processing module 1101 and a communication module 1102. The processing module 1101 is configured to control and manage actions of the communication apparatus, for example, perform the step performed by the processing unit 1001, and/or is configured to perform another process of the technology described in this specification. The communication module 1102 is configured to perform the step performed by the communication unit 1002, and support interaction between the communication apparatus and another device, for example, interaction with another device apparatus. Optionally, as shown in FIG. ii, the communication apparatus may alternatively include a storage module 1103. The storage module 1103 is configured to store program code and data of the communication apparatus.

When the processing module 1101 is a processor, the communication module 1102 is a transceiver, and the storage module 1103 is a memory, the communication apparatus is the communication apparatus shown in FIG. 4a.

Figure 12:
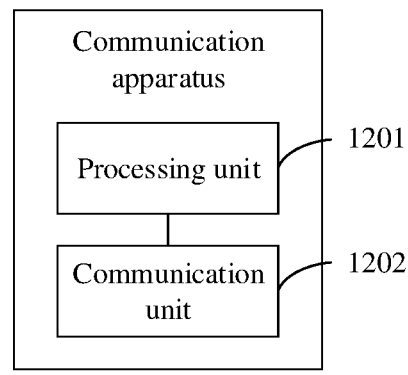

When each function module is obtained through division based on each corresponding function, FIG. 12 is a possible schematic diagram of a structure of the communication apparatus in the foregoing embodiments. The communication apparatus shown in FIG. 12 may be the first network device or the second network device in embodiments of this application, may be a component that implements the foregoing methods in the first network device or the second network device, or may be a chip used in the first network device or the second network device. The chip may be a system-on-a-chip (SOC), a baseband chip having a communication function, or the like. As shown in FIG. 12, the communication apparatus includes a processing unit 1201 and a communication unit 1202. The processing unit 1201 may be one or more processors, and the communication unit 1202 may be a transceiver.

The processing unit 1201 is configured to support a first network device in performing step 501 and step 903, and support a second network device in generating a paging message, and/or is configured to perform another process of the technology described in this specification.

The communication unit 1202 is configured to support communication between the first network device and another communication apparatus, for example, support the first network device in performing step 502, step 701 to step 704, step 801 to step 804, step 901, step 902, step 904, and step 905, and support the second network device in performing step 705, step 805, and step 906, and/or is configured to perform another process of the technology described in this specification.

It should be noted that all related content of the steps in the foregoing method embodiments may be cited in function descriptions of corresponding function modules. Details are not described herein again.

Figure 13:
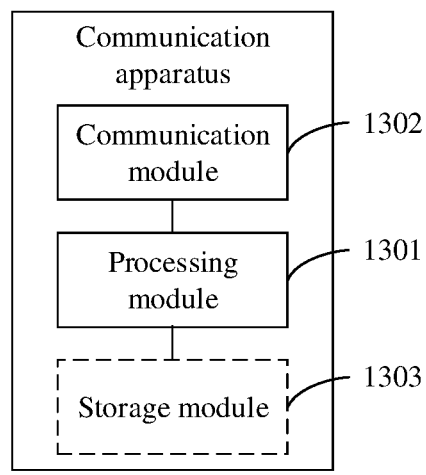

For example, when an integrated unit is used, FIG. 13 is a schematic diagram of a structure of a communication apparatus according to an embodiment of this application. In FIG. 13, the communication apparatus includes a processing module 1301 and a communication module 1302. The processing module 1301 is configured to control and manage actions of the communication apparatus, for example, perform the step performed by the processing unit 1201, and/or is configured to perform another process of the technology described in this specification. The communication module 1302 is configured to perform the step performed by the communication unit 1202, and support interaction between the communication apparatus and another device, for example, interaction with another first network device apparatus. Optionally, as shown in FIG. 13, the communication apparatus may alternatively include a storage module 1303. The storage module 1303 is configured to store program code and data of the communication apparatus.

When the processing module 1301 is a processor, the communication module 1302 is a transceiver, and the storage module 1303 is a memory, the communication apparatus is the communication apparatus shown in FIG. 4b.

An embodiment of this application provides a computer-readable storage medium. The computer-readable storage medium stores instructions, and the instructions are used to perform the method shown in FIG. 5 or FIG. 7 to FIG. 9.

An embodiment of this application provides a computer program product including instructions. When the computer program product runs on a communication apparatus, the communication apparatus is enabled to perform the method shown in FIG. 5 or FIG. 7 to FIG. 9.

An embodiment of this application provides a wireless communication apparatus, The wireless communication apparatus stores instructions. When the wireless communication apparatus runs on the communication apparatuses shown in FIG. 4a, FIG. 4b, and FIG. 10 to FIG. 13, the communication apparatus is enabled to perform the method shown in FIG. 5 or FIG. 7 to FIG. 9. The wireless communication apparatus may be a chip.

An embodiment of this application further provides a communication system, including a terminal device, a first network device, and a second network device. For example, the terminal device may be the communication apparatus shown in FIG. 4a, FIG. 10, or FIG. 11, and the first network device or the second network device may be the communication apparatus shown in FIG. 4b, FIG. 12, or FIG. 13.

According to the foregoing descriptions of the implementations, a person skilled in the art may clearly understand that, for the purpose of convenient and brief descriptions, only division into the foregoing function modules is used as an example for description. In actual application, the foregoing functions may be allocated to different function modules and implemented based on a requirement. To be specific, an inner structure of a database access apparatus is divided into different function modules to implement all or some of the functions described above.

The processor in embodiments of this application may include but is not limited to at least one of the following computing devices that run software, such as, a central processing unit (CPU), a microprocessor, a digital signal processor (DSP), a microcontroller unit (MCU), an artificial intelligence processor, or the like. Each computing device may include one or more cores configured to perform an operation or processing by executing software instructions. The processor may be an independent semiconductor chip, or may be integrated with another circuit to form a semiconductor chip. For example, a SoC (system-on-a-chip) may include the processor and another circuit (for example, an encoding/decoding circuit, a hardware acceleration circuit, or various buses and interface circuits). Alternatively, the processor may be integrated into an ASIC as a built-in processor of the ASIC, and the ASIC integrated with the processor may be independently packaged or may be packaged with another circuit. In addition to the core configured to perform an operation or processing by executing software instructions, the processor may further include a necessary hardware accelerator, for example, a field programmable gate array (FPGA), a programmable logic device (PLD), or a logic circuit that implements a dedicated logic operation.

The memory in embodiments of this application may include at least one of a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

In this application, "at least one" refers to one or more. "A plurality of" means two or more than two. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following" or a similar expression thereof indicates any combination of these items, including any combination of a single item or a plurality of items. For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference.

In the several embodiments provided in this application, it should be understood that the disclosed database access apparatus and method may be implemented in other manners. For example, the foregoing database access apparatus embodiment is merely an example. For example, division into the modules or the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A paging method, wherein the method is applicable to a terminal device, and comprises:
   receiving a first message from a first network device, wherein the first message comprises discontinuous reception (DRX) cycle information, wherein the DRX cycle information is determined based on signal coverage cycle information, wherein the DRX cycle information indicated configuration of a DRX cycle ($T_{UE}$), wherein the DRX cycle ($T_{UE}$) indicates the terminal device to receive a paging message, and wherein the signal coverage cycle information indicates a signal coverage cycle of a second network device; and
   receiving a paging message from the second network device based on the DRX cycle information.

2. The method according to claim 1, wherein the method further comprises:
   sending a second message to the first network device, wherein the second message comprises at least one of first duration, first information, or second information;
   wherein the first duration is determined based on the signal coverage cycle, and indicates an expected DRX cycle ($T_E$) of the terminal device;
   wherein the first information indicates that the terminal device supports a DRX cycle ($T_{UE}$) determined based on the signal coverage cycle; and
   wherein the second information indicates a first offset (Offset 1) of the expected DRX cycle ($T_E$).

3. The method according to claim 1, wherein the DRX cycle ($T_{UE}$) is an integer multiple of the signal coverage cycle.

4. The method according to claim 1, wherein the first message further comprises third information, wherein the third information indicates a second offset (Offset 2) of the DRX cycle ($T_{UE}$).

5. The method according to claim 4, wherein the method further comprises:
   determining, based on the DRX cycle ($T_{UE}$) and the second offset (Offset 2), a time (t') for receiving the paging message.

6. The method according to claim 5, wherein:
   t'=(Offset 2+R*$T_{UE}$) mod $T_C$, wherein R is a positive integer and $T_C$ is a system time cycle; or
   t' is system time ($t_S$) that satisfies the formula ($t_S$+Offset 2) mod $T_{UE}$=UE-ID mod $T_{UE}$, wherein UE-ID is an identifier of the terminal device or is generated based on the identifier of the UE.

7. The method according to claim 6, wherein the method further comprises:
   setting, based on the terminal device receiving the first message from the first network device, R to 0 or 1; or
   setting, based on R reaching a first threshold, R to 0 or 1, wherein the first threshold is predefined or preconfigured.

8. The method according to claim 1, wherein the method further comprises:
   receiving fourth information from the second network device, wherein the fourth information indicates the signal coverage cycle.

9. A paging method, wherein the method is applicable to a first network device, and further comprises:
- determining discontinuous reception (DRX) cycle information based on signal coverage cycle information, wherein a DRX cycle ($T_{UE}$) is configured based on the DRX cycle information, wherein a terminal device receives a paging message based on the DRX cycle ($T_{UE}$), and wherein the signal coverage cycle information indicates a signal coverage cycle of a second network device; and
- sending a first message to the terminal device, wherein the first message comprises the DRX cycle information.

10. The method according to claim 9, wherein the method further comprises:
- receiving a second message from the terminal device, wherein the second message comprises at least one of first duration, first information, or second information;
- wherein the first duration is determined based on the signal coverage cycle, and indicates an expected DRX cycle ($T_E$) of the terminal device;
- wherein the first information indicates that the terminal device supports configuration of a DRX cycle determined based on the signal coverage cycle; and
- wherein the second information indicates a first offset (Offset 1) of the expected DRX cycle ($T_E$).

11. The method according to claim 9, wherein the DRX cycle ($T_{UE}$) is an integer multiple of the signal coverage cycle.

12. The method according to claim 9, wherein the first message further comprises third information, wherein the third information indicates a second offset (Offset 2) of the DRX cycle ($T_{UE}$).

13. The method according to claim 12, wherein the method further comprises:
- sending the second offset (Offset 2) to the second network device.

14. The method according to claim 13, wherein the $T_{UE}$ and the Offset 2 are used by the second network device to determine time (t') for sending the paging message; and
- t'=(Offset 2+R*$T_{UE}$) mod $T_C$, wherein R is a positive integer and $T_C$ is a system time cycle; or
- t' is system time $t_S$ that satisfies the formula ($t_s$+Offset 2) mod $T_{UE}$=UE-ID mod $T_{UE}$, wherein UE-ID is an identifier of a user equipment UE or is generated based on the identifier of the UE.

15. The method according to claim 14, wherein the method further comprises:
- setting, by the first network device, based on the first network device sending the first message to the terminal device, R to 0 or 1; or
- setting, by the first network device, based on R reaching a second threshold, R to 0 or 1, wherein the second threshold is predefined or preconfigured.

16. An apparatus, comprising:
- one or more processors; and
- one or more non-transitory computer-readable storage mediums storing a program to be executed by the one or more processors, the program including instructions for:
  - receiving a first message from a first network device, wherein the first message comprises discontinuous reception (DRX) cycle information, wherein the DRX cycle information is determined based on signal coverage cycle information, wherein a DRX cycle ($T_{UE}$) is configured based on the DRX cycle information, wherein a terminal device receives a paging message based on the DRX cycle ($T_{UE}$), and the signal coverage cycle information indicates a signal coverage cycle of a second network device; and
  - receiving a paging message from the second network device based on the DRX cycle information.

17. The apparatus according to claim 16, wherein the instructions further include instructions for:
- sending a second message to the first network device, wherein the second message comprises at least one of first duration, first information, or second information;
- wherein the first duration is determined based on the signal coverage cycle, and indicates an expected DRX cycle ($T_E$) of the terminal device;
- wherein the first information indicates that the terminal device supports a DRX cycle ($T_{UE}$) determined based on the signal coverage cycle; and
- wherein the second information indicates a first offset (Offset 1) of the expected DRX cycle ($T_E$).

18. The apparatus according to claim 16, wherein the DRX cycle ($T_{UE}$) is an integer multiple of the signal coverage cycle.

19. The apparatus according to claim 16, wherein the first message further comprises third information, wherein the third information indicates a second offset (Offset 2) of the DRX cycle ($T_{UE}$).

20. The apparatus according to claim 19, wherein the instructions further include instructions for:
- determining, based on the DRX cycle $T_{UE}$ and the second offset (Offset 2), a time (t') for receiving the paging message.

* * * * *

UNITED STATES PATENT AND TRADEMARK OFFICE
CERTIFICATE OF CORRECTION

| | |
|---|---|
| PATENT NO. | : 12,200,661 B2 |
| APPLICATION NO. | : 17/867372 |
| DATED | : January 14, 2025 |
| INVENTOR(S) | : Wang et al. |

Page 1 of 1

It is certified that error appears in the above-identified patent and that said Letters Patent is hereby corrected as shown below:

In the Claims

In Column 35, in Claim 14, Line 43, after "formula" delete "($t_s$" and insert -- (ts --.

Signed and Sealed this
Eighteenth Day of February, 2025

Coke Morgan Stewart
*Acting Director of the United States Patent and Trademark Office*